US012648055B2

(12) United States Patent
Kwack et al.

(10) Patent No.: US 12,648,055 B2
(45) Date of Patent: Jun. 2, 2026

(54) INDUCTION HEATING TYPE COOKTOP FOR HEATING OBJECT BY INDUCTION HEATING OF THIN FILM

(71) Applicant: LG Electronics Inc., Seoul (KR)

(72) Inventors: Younghwan Kwack, Seoul (KR); Seongho Son, Seoul (KR); Seonho Jeon, Seoul (KR); Chuhyoung Cho, Seoul (KR); Jongseong Ji, Seoul (KR)

(73) Assignee: LG Electronics Inc., Seoul (KR)

( * ) Notice: Subject to any disclaimer, the term of this patent is extended or adjusted under 35 U.S.C. 154(b) by 663 days.

(21) Appl. No.: 17/025,559

(22) Filed: Sep. 18, 2020

(65) Prior Publication Data

US 2021/0315067 A1 Oct. 7, 2021

(30) Foreign Application Priority Data

Apr. 2, 2020 (KR) ........................ 10-2020-0040234

(51) Int. Cl.
*H05B 6/10* (2006.01)
*H05B 6/12* (2006.01)

(52) U.S. Cl.
CPC ........... *H05B 6/105* (2013.01); *H05B 6/1209* (2013.01)

(58) Field of Classification Search
CPC .... H05B 6/105; H05B 6/1209; H05B 6/1236; H05B 6/1245
See application file for complete search history.

(56) References Cited

U.S. PATENT DOCUMENTS 4,629,843 A * 12/1986 Kato .................... H05B 6/1254 219/676
6,633,023 B2 10/2003 Cornec et al.
6,770,857 B2 8/2004 Hirota et al.
7,081,603 B2 7/2006 Hoh et al.
(Continued)

FOREIGN PATENT DOCUMENTS

DE 10127051 12/2002
DE 102006017802 A1 11/2007
(Continued)

OTHER PUBLICATIONS

Machine translation of KR100818944: Kim, A Heating Apparatus and Luminous Apparatus Using Induction Heating, 2011 (Year: 2011).*
(Continued)

*Primary Examiner* — Vy T Nguyen
*Assistant Examiner* — Abigail H Rhue
(74) *Attorney, Agent, or Firm* — Fish & Richardson P.C.

(57) ABSTRACT

An induction heating type cooktop includes a case, an upper plate coupled to a top of the case and configured to support a target heating object, a working coil disposed inside the case and configured to heat the target heating object, a thin film disposed at a top surface of the upper plate or a bottom surface of the upper plate, and an insulator disposed between the bottom surface of the upper plate and the working coil. The thin film includes a plurality of sub-thin films that are arranged about a central portion of the working coil. Each of the plurality of sub-thin films defines a closed loop surrounding the central portion of the working coil. The thin firm further includes a heat conduction member that is arranged in a predetermined pattern and contacts at least one of the plurality of sub-thin films.

19 Claims, 24 Drawing Sheets

(56) References Cited

U.S. PATENT DOCUMENTS

| | | | | |
|---|---|---|---|---|
| 9,510,398 | B1 * | 11/2016 | Miller | H05B 6/1209 |
| 9,807,822 | B2 * | 10/2017 | Alonso Esteban | C03C 17/36 |
| 11,441,783 | B2 * | 9/2022 | Kim | H05B 3/748 |
| 2009/0057298 | A1 | 3/2009 | Komma | |
| 2012/0138596 | A1 | 6/2012 | Esteban et al. | |
| 2019/0208584 | A1 | 7/2019 | Kisner | |
| 2019/0223263 | A1 * | 7/2019 | Park | H05B 6/42 |
| 2019/0342953 | A1 * | 11/2019 | Nam | H05B 6/1254 |
| 2021/0005481 | A1 * | 1/2021 | Amai | H01L 21/304 |
| 2022/0183116 | A1 * | 6/2022 | Suga | H05B 6/1236 |

FOREIGN PATENT DOCUMENTS

| | | | |
|---|---|---|---|
| EP | 1487239 | | 12/2004 |
| EP | 1536669 | | 6/2005 |
| EP | 2467343 | B1 | 4/2014 |
| EP | 3270660 | | 1/2019 |
| EP | 3512302 | | 7/2019 |
| EP | 3618569 | | 3/2020 |
| EP | 3840529 | A1 | 6/2021 |
| EP | 3840531 | A1 | 6/2021 |
| EP | 3866566 | A1 | 8/2021 |
| EP | 3869910 | A1 | 8/2021 |
| EP | 3869911 | A1 | 8/2021 |
| EP | 3869912 | A1 | 8/2021 |
| EP | 3869917 | A1 | 8/2021 |
| JP | 3496558 | | 2/2004 |
| JP | 2008293888 | | 12/2008 |
| JP | 2008311058 | | 12/2008 |
| JP | 5630495 | | 11/2014 |
| KR | 1020050033551 | | 4/2005 |
| KR | 100818944 | B1 * | 11/2006 |
| WO | WO 2021-201477 | A1 | 10/2021 |

OTHER PUBLICATIONS

Extended European Search Report in European Appln. No. 21153653.7, dated Jul. 5, 2021, 5 pages.

Extended Search Report in European Appln. No. 22193896.2, mailed on Feb. 14, 2023, 13 pages.

* cited by examiner

INDUCTION HEATING TYPE COOKTOP FOR HEATING OBJECT BY INDUCTION HEATING OF THIN FILM

CROSS-REFERENCE TO RELATED APPLICATION

This application claims the benefit of Korean Patent Application No. 10-2020-0040234, filed on Apr. 2, 2020, the disclosure of which is incorporated herein in its entirety by reference.

TECHNICAL FIELD

The present disclosure relates to a shape of a thin film for heating an object made of various materials in an induction heating type cooktop.

BACKGROUND

Various types of cooking devices may be used to cook food at home or at restaurants. For example, gas ranges may use gas as fuel to heat food. In some cases, cooking devices may heat a target heating object such as a pot and a cooking vessel using electricity rather than gas.

In some examples, methods for heating a target heating object using electricity may be divided into a resistance heating method and an induction heating method. In the electric resistance heating method, a target heating object may be heated by heat that is generated when a current flows in a metal resistance wire or a non-metallic heating element such as Silicon Carbide (SiC) and transferred to the target heating object (e.g., a cooking vessel) through heat dissipation or heat transfer. In the induction heating method, a target heating object may be heated by an eddy current generated in the target heating object made of a metal material using an electrical field that is generated around a coil when a high frequency power having a predetermined magnitude is applied to the coil.

The induction heating method may be applied to cooktops.

In some cases, a cooktop using an induction heating method may only heat an object made of a magnetic material. That is, when an object made of a nonmagnetic material (for example, heat-resistant glass, porcelain, etc.) is disposed on the cooktop, the cooktop may not heat the nonmagnetic material object.

In some cases, an induction heating device may include a heating plate disposed between a cooktop and a nonmagnetic object to heat the object. In some cases, a method of implementing induction heating by adding the heating plate may have a low heating efficiency due to the heating plate, and a cooking time to heat ingredients contained in the target heating object may be increased.

In some cases, a hybrid cooktop may heat a nonmagnetic object through a radiant heater using an electric resistance heating method, where a magnetic object is heated through a working coil by induction. In some cases, the hybrid cooktop may have a low output of the radiant heater, and a heating efficiency may be low. A user may feel inconvenience in considering a material of a target heating object when placing the target heating object in the heating area.

In some cases, an all metal cooktop may heat a metal object (e.g., a nonmagnetic metal and a magnetic object.

However, the all metal cooktop may not heat a nonmagnetic and non-metallic object. In addition, a heating efficiency may be lower than a radiant heater technology, and a material cost may be high.

In some cases, a cooktop may include a thin layer (thin layer or thin film), which is a separate component that can be induction heated. Thus, it may be possible to heat a container made of a magnetic material and thus capable of being induction heated and a container incapable of being directly induction heated using heat conducted from a thin film that is separately induction heated. In some cases, the heating efficiency of a target heating object may be different according to whether the object is made of a magnetic material or a non-magnetic material, and thus, the heating efficiency and usability of the induction heating type cooktop may be different according to the form of a thin film. A thin film, arranged between a target heating object and a working coil, may affect an equivalent circuit seen from the working coil and affect heating efficiency of the target heating object according to the form of the thin film. Thus, the thin film may have influence on the usability of a cooktop that heats a target heating object made of various materials.

SUMMARY

The present disclosure describes an induction heating type cooktop capable of heating both a magnetic object and a nonmagnetic object.

The present disclosure also describes an induction heating type cooktop including a thin film that is provided in an optimized shape in which a target heating object can be heated efficiently not just when the target heating object is induction heated but also when the target heating object is heated by heat conduction with an induction heated thin film.

Objects of the present disclosure are not limited thereto, and other objects and advantages of the present disclosure will be understood by the following description, and will become more apparent from implementations of the present disclosure. Furthermore, the objects, features and advantages of the present disclosure can be realized by means disclosed in the accompanying claims or combination thereof.

According to one aspect of the subject matter described in this application, an induction heating type cooktop includes a case, an upper plate coupled to a top of the case and configured to support a target heating object, a working coil disposed inside the case and configured to heat the target heating object, a thin film disposed at a top surface of the upper plate or a bottom surface of the upper plate, and an insulator disposed between the bottom surface of the upper plate and the working coil. The thin film includes a plurality of sub-thin films that are arranged about a central portion of the working coil. Each of the plurality of sub-thin films defines a closed loop surrounding the central portion of the working coil. The thin firm further includes a heat conduction member that is arranged in a predetermined pattern and contacts at least one of the plurality of sub-thin films.

Implementations according to this aspect may include one or more of the following features. For example, each of the plurality of sub-thin films may have a ring shape that defines the closed loop. In some examples, the working coil may be configured to generate a magnetic field, where at least a portion of the magnetic field has a magnitude greater than or equal to a predetermined threshold, and the heat conduction member may be disposed at a position corresponding to at least the portion of the magnetic field.

In some implementations, the plurality of sub-thin films may be spaced apart from one another in a radial direction. In some examples, the predetermined pattern of the heat conduction member may include a comb pattern. In some examples, the heat conduction member may have a width that is less than or equal to a predetermined threshold width to thereby limit a magnitude of current leaked from the plurality of sub-thin films to the heat conduction member. In some examples, the magnitude of current in the heat conduction member may be less than or equal to a predetermined threshold current level. In some implementations, the width of the heat conduction member may be in a range from 1 mm to 5 mm.

In some implementations, the plurality of sub-thin films may be configured to, based on the target heating object made of a non-magnetic material being placed on the upper plate, be heated by induction and provide heat to each of the heat conduction member and the target heating object to thereby heat the target heating object by the plurality of sub-thin films and the heat conduction member. In some implementations, the heat conduction member may be configured to, based on the target heating object made of a magnetic material being placed at the upper plate, pass a magnetic field that is generated by the working coil through the heat conduction member to thereby inductively heat the target heating object.

In some implementations, the working coil may be configured to induce current based on the thin film and the target heating object forming an equivalent circuit comprising a resistance component and an inductor component. In some examples, a thickness of the thin film may define the resistance component and the inductor component of the equivalent circuit to enable induction heating by the working coil. In some examples, the thickness of the thin film is 6 μm. In some implementations, the thickness of the thin film may be less than a skin depth of the thin film.

In some implementations, the heat conduction member may include a plurality of radial connections arranged in a circumferential direction and spaced apart from one another in the circumferential direction, each of the plurality of radial connections extending in a radial direction between the plurality of sub-thin films. In some examples, each of the plurality of radial connections connects to the plurality of sub-thin films in the radial direction. In some examples, each of the plurality of radial connections may have a linear shape parallel to the radial direction. In some examples, each of the plurality of radial connections has a curved shape extending in the circumferential direction and the radial direction between the plurality of sub-thin films.

In some examples, the plurality of radial connections may include a plurality of first radial connections that extend radially outward from an inner sub-thin film among the plurality of sub-thin films, and a plurality of second radial connections that extend from an outer sub-thin film among the plurality of sub-thin films toward the inner sub-thin film. The plurality of first radial connections and the plurality of second radial connections may be alternately arranged along the circumferential direction.

In some examples, a radial length of each of the plurality of radial connections may be less than or equal to a distance between two of the plurality of sub-thin films.

In some implementations, where a thin film including a plurality of sub-thin films is connected through a heat conduction member disposed in a predetermined pattern, heat may be conducted from the induction-heated sub-thin films to the heat conduction member, and as a magnetic field influences a target heating object through the predetermined pattern, it may be possible to allow induction heating of the target heating object.

In some implementations, where a plurality of sub-thin films constituting a thin film and forming a closed loop and a heat conduction member are used, it may be possible to expand a heating area by heating a target heating object with heat transferred from the sub-thin films being induction heated.

In some implementations, an induced current may be limited or prevented from flowing to the heat conduction member, and a closed loop of currents may not be formed through the heat conduction member.

BRIEF DESCRIPTION OF THE DRAWINGS

The above and other aspects, features, and advantages of certain implementations will be more apparent from the following detailed description taken in conjunction with the accompanying drawings.

DETAILED DESCRIPTION

Figure 1:
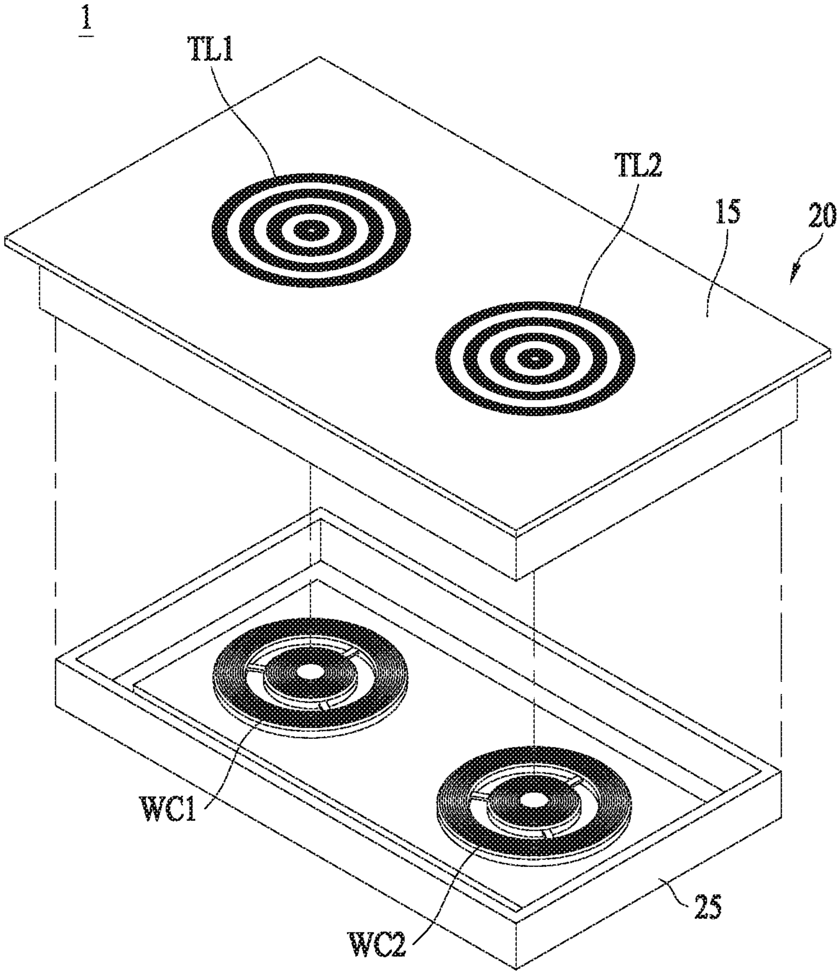
FIG. 1 is a diagram illustrating an example of an induction heating type cooktop.

Hereinafter, one or more implementations of the present disclosure will be described in detail with reference to the drawings so that those skilled in the art to which the present disclosure pertains can easily perform the present disclosure. The present disclosure may be implemented in many different forms and is not limited to the implementations described herein.

In order to clearly illustrate this application, a part that is not related to the description is omitted, and the same or similar components are denoted by the same reference numerals throughout the specification. Further, one or more implementations of this application will be described in detail with reference to exemplary drawings. In adding the reference numerals to the components of each drawing, the same components may have the same sign as possible even if they are displayed on different drawings. Further, in describing this application, when it is determined that a detailed description of a related known configuration and a function may obscure the gist of this application, the detailed description thereof will be omitted.

In describing the component of this application, it is possible to use the terms such as first, second, A, B, (a), (b), etc. These terms are only intended to distinguish a component from another component, and a nature, an order, a sequence, or the number of the corresponding components are not limited by that term. When a component is described as being "connected", "coupled", or "connected" to another component, the component may be directly connected or connected to another component, it is to be understood that another component is "interposed" between each component, or each component is "connected", "coupled", or "connected" through another component.

It will be understood that the terms "comprising", "including", "having" and variants thereof specify the presence of stated features, numbers, steps, operations, elements, components, and/or groups thereof, but do not preclude the presence or addition of one or more other features, numbers, steps, operations, elements, components, and/or groups thereof.

Further, in implementing the present disclosure, for convenience of explanation, components may be described by being subdivided; however, these components may be implemented in a device or a module, or a single component may be implemented by being divided into a plurality of devices or modules.

Hereinafter, one or more examples of an induction heating type cooktop will be described.

FIG. 1 is a diagram illustrating an example of an induction heating type cooktop.

Referring to FIG. 1, an induction heating type cooktop 10 may include a case 25, a cover plate 20, working coils WC1 and WC2 (that is, first and second working coils), and thin films TL1 and TL2 (that is, first and second thin films).

The working coils WC1 and WC2 may be installed in the case 25.

In some implementations, a variety of devices related to driving of a working coil other than the working coils WC1 and WC2 may be installed in the case 25. For example, the devices relating to driving of a working coil may include a power part for providing alternating current power, a rectifying part for rectifying alternating current power from the power part to direct current power, an inverter part for inverting the direct power rectified by the rectifying part to a resonance current through a switching operation, a control part for controlling operations of various devices in the induction heating type cooktop 10, a relay or a semiconductor switch for turning on and off a working coil, and the like. Regarding this, a detailed description will be herein omitted.

The cover plate 20 may be coupled to a top of the case 25, and may include an upper plate 15 for placing a target object to be heated on the top.

For example, the cover plate 20 may include the upper plate 15 for placing a target object to be heated, such as a cooking vessel.

In some examples, the upper plate 15 may be made of a glass material (e.g., ceramic glass).

In some implementations, an input interface may be provided in the upper plate 15 to receive an input from a user and transfer the input to a control part that serves as an input interface. The input interface may be provided at a position other than the upper plate 15.

The input interface may be configured to allow a user to input a desired heat intensity or an operation time of the induction heating type cooktop 10. The input interface may be implemented in various forms, such as a mechanical button or a touch panel. The input interface may include, for example, a power button, a lock button, a power control button (+, −), a timer control button (+, −), a charging mode button, and the like. The input interface may transfer an input provided by a user to a control part for the input interface, and the control part for the input interface may transfer the input to the aforementioned control part (that is, a control part for an inverter). The aforementioned control part may control operations of various devices (e.g., a working coil) based on an input (that is, a user input) provided from the control part for the input interface, and a detailed description thereof will be omitted. In some examples, the control part may be a controller, a processor, or an electric circuit.

The upper plate 15 may visually display whether the working coils WC1 and WC2 are being driven or not and intensity of heating (that is, thermal power). For example, a fire hole shape may be displayed in the upper plate 15 by an indicator that includes a plurality of light emitting devices (e.g., light emitting diodes (LEDs)) provided in the case 25.

The working coils WC1 and WC2 may be installed inside the case 25 to heat a target heating object.

Specifically, driving of the working coils WC1 and WC2 may be controlled by the aforementioned control part. When the target heating object is positioned on the upper plate 15, the working coils WC1 and WC2 may be driven by the control part.

In some implementations, the working coils WC1 and WC2 may directly heat a magnetic target heating object (that is, a magnetic object) and may indirectly heat a nonmagnetic target heating object (that is, a nonmagnetic object) through the thin films TL1 and TL2 which will be described in the following.

The working coils WC1 and WC2 may heat a target heating object by employing an induction heating method and may be provided to overlap the thin films TL1 and TL2 in a longitudinal direction (that is, a vertical direction or an up-down direction).

Although FIG. 1 illustrates that two working coils WC1 and WC2 are installed in the case 25, but aspects of the present disclosure are not limited thereto. That is, one working coil or three or more working coils may be installed in the case 25. Yet, for convenience of explanation, an example in which two working coils WC1 and WC2 are installed in the case 25 will be described.

The thin films TL1 and TL2 may be coated on the upper plate 15 to heat a nonmagnetic object among target heating objects.

Specifically, the thin films TL1 and TL2 may be coated on at least one of a top surface and a bottom surface of the upper plate 15 and may be provided to overlap the working coils WC1 and WC2 in a longitudinal direction (that is, a vertical direction or an up-down direction). Accordingly, it may be possible to heat the corresponding target heating object, regardless of a position and a type of the target heating object.

The thin films TL1 and TL2 may have at least one of a magnetic property and a nonmagnetic property (that is, either or both of the magnetic property and the nonmagnetic property).

In addition, the thin films TL1 and TL2 may be made of, for example, a conductive material, and may be coated on an upper surface of the upper plate 15 in the shape in which a plurality of rings having different diameters is repeated, as shown in the drawing. However, the present disclosure is not limited thereto.

That is, the thin films TL1 and TL2 may include a material other than a conductive material and may be coated on the upper plate 15 by taking a different form. Hereinafter, for convenience of explanation, an example in which the thin films TL1 and TL2 is made of a conductive material and coated on the upper plate 15 in the form of a plurality of rings having different diameters will be described.

For reference, two thin films TL1 and TL2 are illustrated in FIG. 1, but the present disclosure is not limited thereto. That is, one thin film or three or more thin films may be coated. However, for convenience of explanation, one implementation in which the two thin films TL1 and TL2 are coated is described as an example.

However, FIG. 1 is a diagram illustrating an exemplary dispositional relationship between elements used in the present disclosure. Therefore, shapes, numbers, and positions of the elements should not be construed as being limited to the example shown in FIG. 2.

The thin films TL1 and TL2 will be described later in more detail.

Figure 2:
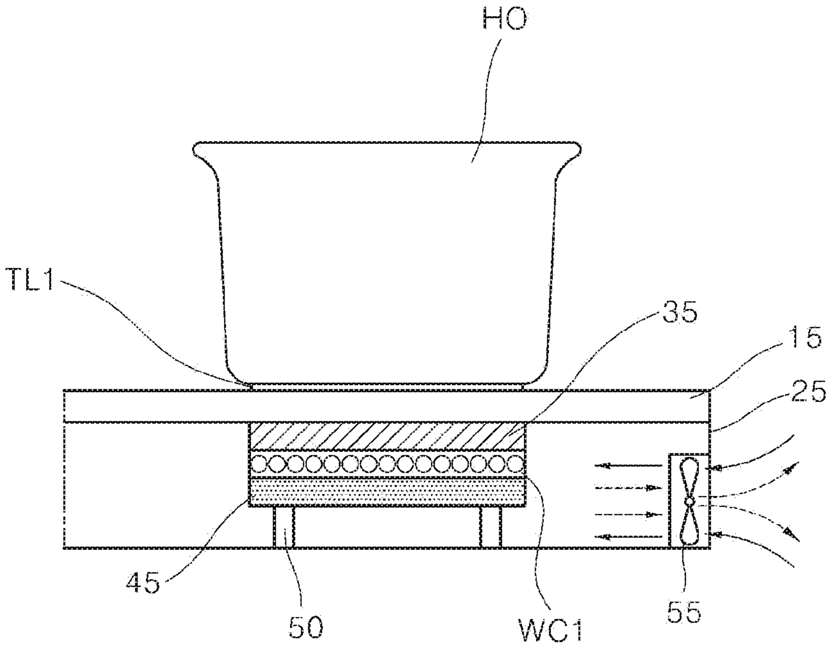
FIG. 2 is a diagram illustrating example elements disposed in an example of a case of the induction heating type cooktop shown in FIG. 1.

FIG. 2 is a diagram illustrating example elements provided inside a case of the induction heating type cooktop shown in FIG. 1.

Referring to FIG. 2, the induction heating type cooktop 10 may further include an insulator 35, a shield plate 45, a support member 50, and a cooling fan 55.

Since elements disposed in the surroundings of a first working coil WC1 are identical to elements disposed in the surroundings of a second working coil WC2 (the working coil in FIG. 1), the elements (e.g., the first thin film TL1, the insulator 35, the shield plate 45, the support member 50, and the cooling fan 55) in the surroundings of the first working coil WC1 will be hereinafter described for convenience of explanation.

The insulator 35 may be provided between a bottom surface of the upper plate 15 and the first working coil WC1.

Specifically, the insulator 35 may be mounted to the cover plate 20, that is, the bottom of the upper plate 15. The first working coil WC1 may be disposed below the insulator 35.

The insulator 35 may block heat, which is generated when the first thin film TL1 or a target heating object HO is heated upon driving of the first working coil WC1, from being transferred to the first working coil WC1.

That is, when the first thin film TL1 or the target heating object HO is heated by electromagnetic induction of the first working coil WC1, heat of the first thin film TL1 or the target heating object HO may be transferred to the upper plate 15 and the heat transferred to the upper plate 15 may be transferred to the first working coil WC1, thereby possibly causing damage to the first working coil WC1.

By blocking the heat from being transferred to the first working coil WC1, the insulator 35 may prevent damage of the first working coil WC1 caused by the heat and furthermore prevent degradation of heating performance of the first working coil WC1.

A spacer, which is not an essential constituent element, may be installed between the first working coil WC1 and the insulator 35.

Specifically, the spacer may be inserted between the first working coil WC1 and the insulator 35, so that the first working coil WC1 and the insulator 35 do not directly contact each other. Accordingly, the spacer may block heat, which is generated when the first thin film TL1 and the target heating object HO are heated upon driving of the first working coil WC1, from being transferred to the first working coil WC1 through the insulator 35.

That is, since the spacer may share the role of the insulator 35, it may be possible to minimize a thickness of the insulator 35 and accordingly minimize a gap between the target heating object HO and the first working coil WC1.

In addition, a plurality of spacers may be provided, and the plurality of spaces may be disposed to be spaced apart from each other in the gap between the first working coil WC1 and the insulator 35. Accordingly, air suctioned into the case 25 by the cooling fan 55 may be guided to the first working coil WC1 by the spacer.

That is, the spacer may guide air, introduced into the case 25 by the cooling fan 55, to be properly transferred to the first working coil WC1, thereby improving cooling efficiency of the first working coil WC1.

The shield plate 45 may be mounted to a bottom of the first working coil WC1 to block a magnetic field occurring downwardly upon driving of the first working coil WC1.

Specifically, the shield plate 45 may block the magnetic field occurring downwardly upon driving of the first working coil WC1 and may be supported upwardly by the support member 50.

The support member 50 may be installed between a bottom surface of the shield plate 45 and a bottom surface of the case 25 to support the shield plate 45 upwardly.

Specifically, by supporting the shield plate 45 upwardly, the support member 50 may indirectly support the insulator 35 and the first working coil WC1 upwardly. In doing so, the insulator 35 may be brought into tight contact with the upper plate 15.

As a result, it may be possible to maintain a constant gap between the first working coil WC1 and the target heating object HO.

The support member 50 may include, for example, an elastic object (e.g., a spring) to support the shield plate 45 upwardly, but aspects of the present disclosure are not limited thereto. In addition, the support member 50 is not an essential element and thus it may be omitted from the induction heating type cooktop 10.

The cooling fan 55 may be installed inside the case 25 to cool the first working coil WC1.

Specifically, driving of the cooling fan 55 may be controlled by the aforementioned control part and the cooling fan 55 may be installed at a side wall of the case 25. The cooling fan 55 may be installed at a position other than the side wall of the case 25. In an implementation, for convenience of explanation, an example in which the cooling fan 55 is installed at the side wall of the case 25 will be described.

The cooling fan 55 may suction outdoor air from the outside of the case 25, as shown in FIG. 2, and transfer the suctioned air to the first working coil WC1. The cooling fan 55 may suction indoor air (e.g., heated air) of the case 25 and discharge the suctioned air to the outside of the case 25.

In doing so, it may be possible to efficiently cool internal elements (e.g., first working coil WC1) of the case 25.

In some examples, the outdoor air transferred from the outside of the case 25 to the first working coil WC1 by the cooling fan may be guided to the first working coil WC1 by the spacer. Accordingly, it may be possible to directly and efficiently cool the first working coil WC1, thereby improving endurance of the first working coil WC1. That is, it may be possible to improve the endurance by preventing thermal damage.

In some examples, the induction heating type cooktop 10 may include one or more of the above-described features and configurations. Hereinafter, features and configurations of the aforementioned thin film will be described in more detail with reference to FIGS. 3 to 6.

Figure 3:
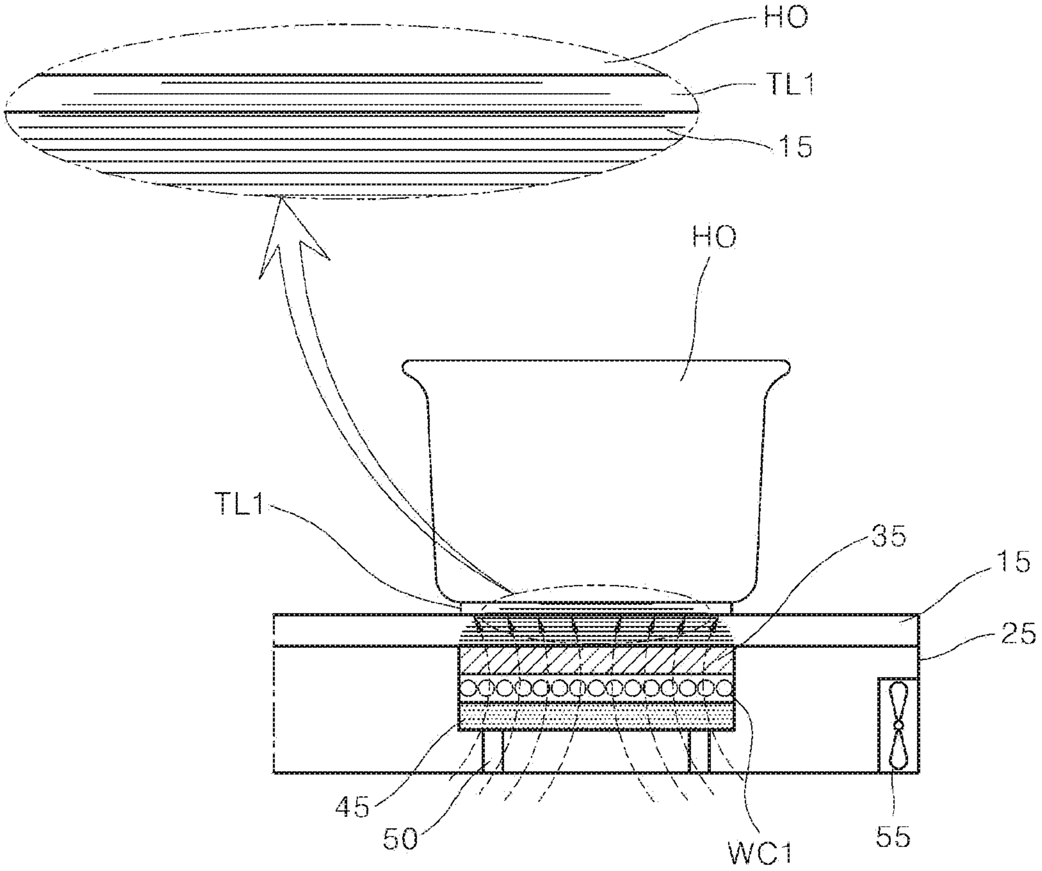
FIGS. 3 and 4 are diagrams illustrating examples of a thickness of a thin film and a skin depth of the thin film of an induction heating type cooktop.
Figure 4:
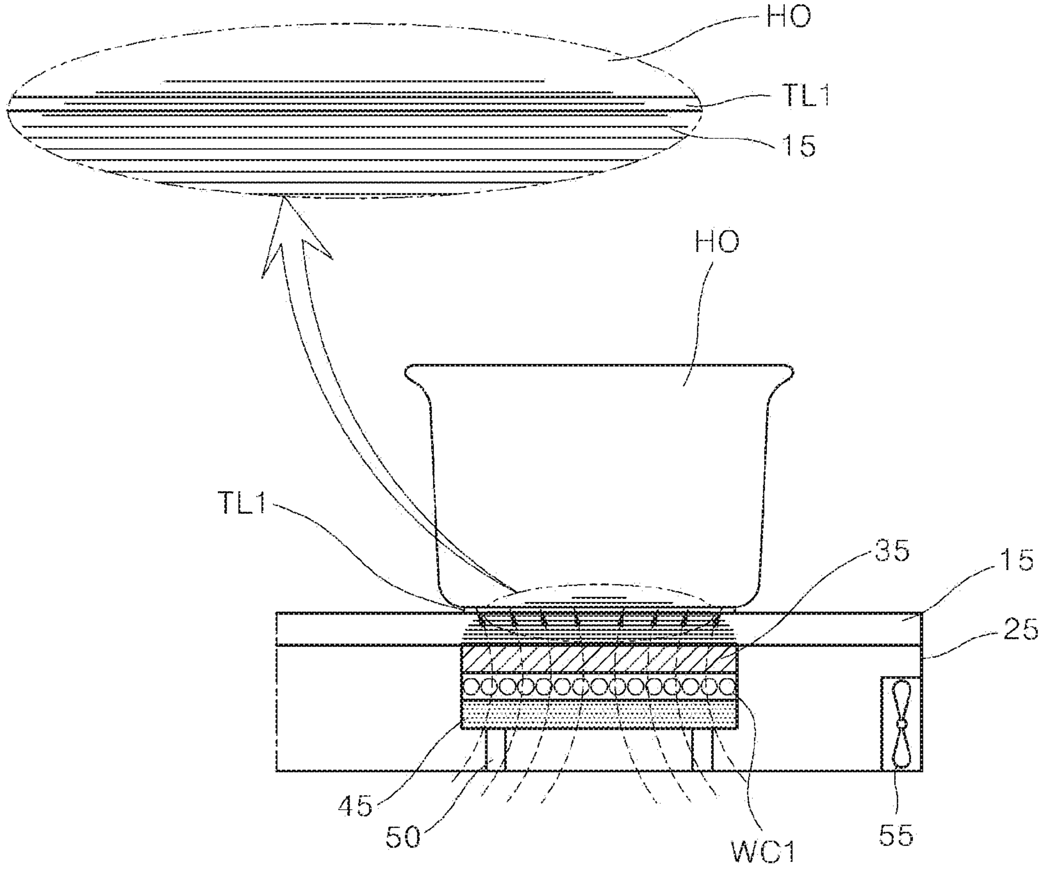
Figure 5:
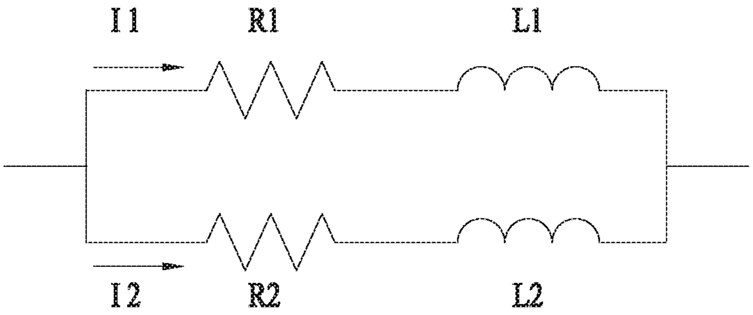
FIGS. 5 and 6 are diagrams illustrating examples of equivalent circuits defining an electric impedance between a thin film and a target heating object depending on a type of the target heating object.
Figure 6:
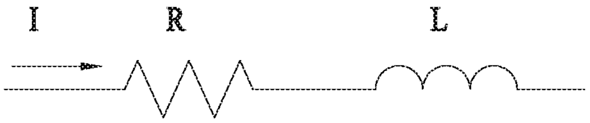

FIGS. 3 and 4 are diagrams illustrating a relation between a thickness and a skin depth of a thin film. FIGS. 5 and 6 are diagrams illustrating a variation of impedance between a thin film and a target heating object depending on a type of the target heating object.

The first thin film TL1 and the second thin film TL2 have the same technical features, and the thin film TL1 and TL2 may be coated on the top surface or the bottom surface of the upper plate 15. Hereinafter, for convenience of explanation, the first thin film TL1 coated on the top surface of the upper plate 15 will be described as an example.

The first thin film TL1 has the following features.

In some implementations, the first thin film TL1 may include a material having a low relative permeability.

For example, since the first thin film TL1 has a low relative permeability, the skin depth of the first thin film TL1 may be deep. The skin depth may refer to a depth by which a current can penetrate a material surface, and the relative permeability may be disproportional to the skin depth. Accordingly, the lower the relative permeability of the first thin film TL1, the deeper the skin depth of the first thin film TL1.

In some examples, the skin depth of the first thin film TL1 may have a value greater than a value corresponding to a thickness of the first thin film TL1. That is, since the first thin film TL1 has a thin thickness (e.g., a thickness of 0.1 μm~1,000 μm) and a skin depth of the first thin film TL1 is greater than the thickness of the first thin film TL1, a magnetic field occurring by the first working coil WC1 may pass through the first thin film TL1 and be then transferred to the target heating object HO. As a result, an eddy current may be induced to the target heating object HO.

That is, as illustrated in FIG. 3, when the skin depth of the first thin film TL1 is narrower than the thickness of the first thin film TL1, it is difficult for the magnetic field occurring by the first working coil WC1 to reach the target heating object HO.

In some implementations, as illustrated in FIG. 4, when the skin depth of the first skin depth TL1 is deeper than the thickness of the first thin film TL1, most of the magnetic field generated by the first working coil WC1 may be transferred to the target heating object HO. That is, since the skin depth of the first thin film TL1 is deeper than the thickness of the first thin film TL1, the magnetic field generated by the first working coil WC1 may pass through the first thin film TL1 and most of the magnetic field energy may be dissipated in the target heating object HO. In doing so, the target heating object HO may be heated primarily.

Since the first thin film TL1 has a thin thickness as described above, the thin film TL1 may have a resistance value that allows the first thin film TL1 to be heated by the first working coil WC1.

Specifically, the thickness of the first thin film TL1 may be disproportional to the resistance value of the first thin film TL1 (that is, a sheet resistance value). That is, the thinner the thickness of the first thin film TL1 coated on the upper plate 15, the greater the resistance value (that is, the sheet resistance) of the first thin film TL1. As thinly coated on the upper plate 15, the first thin film TL1 may change in property to a load resistance at which heating may be possible.

The first thin film TL1 may have a thickness of, for example, 0.1 μm to 1,000 μm, but not limited thereto.

The first thin film TL1 having the above-described characteristic is present to heat a nonmagnetic object, and thus, an impedance property between the first thin film TL1 and the target heating object HO may vary according to whether the target heating object HO positioned on the top of the upper plate 15 is a magnetic object or a nonmagnetic object.

One or more examples, where the target heating object is a magnetic object, will be described in the following.

Referring to FIGS. 2 and 5, when the first working coil WC1 is driven while a magnetic target heating object HO is positioned on the top of the upper plate 15, a resistance component R1 and an inductor component L1 of the magnetic target heating object HO may form an equivalent circuit to that of a resistance component R2 and an inductor component L2 of the first thin film TL1.

In this case, in the equivalent circuit, an impedance (that is, an impedance of R1 and L1) of the magnetic target heating object HO may be smaller than an impedance (that is, an impedance of R2 and L2) of the first thin film TL1.

Accordingly, when the aforementioned equivalent circuit is formed, the magnitude of an eddy current I1 applied to the magnetic target heating object HO may be greater than the magnitude of an eddy current I2 applied to the first thin film TL1. More specifically, most of eddy currents may be applied to the target heating object HO, thereby heating the target heating object HO.

That is, when the target heating object HO is a magnetic object, the aforementioned equivalent circuit may be formed and most of eddy currents may be applied to the target heating object HO. Accordingly, the first working coil WC1 may directly heat the target heating object HO.

Since some of eddy currents is applied even to the first thin film TL1, the first thin film TL1 may be heated slightly. Accordingly, the target heating object HO may be indirectly heated to a certain degree by the thin film TL1. However, a degree to which the target heating object HO is heated indirectly by the first thin film TL1 may not be considered significant, as compared with a degree to which the target heating object HO is heated directly by the first working coil WC1.

One or more examples, where a target heating object is a nonmagnetic object, will be described in the following.

Referring to FIGS. 2 and 6, when the working coil WC1 is driven while a nonmagnetic target heating object HO is positioned on the top of the upper plate 15, an impedance may not exist in the nonmagnetic target heating object HO but exists in the first thin film TL1. That is, a resistance component R and an inductor component L may exist only in the first thin film TL1.

Accordingly, an eddy current I may be applied only to the first thin film TL1 and may not be applied to the nonmagnetic target heating object HO. More specifically, the eddy current I may be applied only to the first thin film TL1, thereby heating the first thin film TL1.

That is, when the target heating object HO is a nonmagnetic object, the eddy current I may be applied to the first thin film TL1, thereby heating the first thin film TL1. Accordingly, the nonmagnetic target heating object HO may be indirectly heated by the first thin film TL1 that is heated by the first working coil WC1.

To put it briefly, regardless of whether the target heating object HO is a magnetic object or a nonmagnetic object, the target heating object HO may be heated directly or indirectly by a single heating source which is the first working coil WC1. That is, when the target heating object HO is a magnetic object, the first working coil WC1 may directly heat the target heating object HO, and, when the target heating object HO is a nonmagnetic object, the first thin film TL1 heated by the first working coil WC1 may indirectly heat the target heating object HO.

As described above, the induction heating type cooktop 10 may be capable of heating both a magnetic object and a nonmagnetic object. Thus, the induction heating type cooktop 10 may be capable of heating a target heating object regardless of a position and a type of the target heating object. Accordingly, without determining whether the target heating object is a magnetic object or a nonmagnetic object, a user is allowed to place the target heating object in any heating region on the top plate, and therefore, convenience of use may improve.

In addition, the induction heating type cooktop 10 may directly or indirectly heat a target heating object using the same heating source, and therefore, a heat plate or a radiant heater is not necessary. Accordingly, it may be possible to increase heating efficiency and cut down a material cost.

Hereinafter, an induction heating type cooktop will be described.

Figure 7:
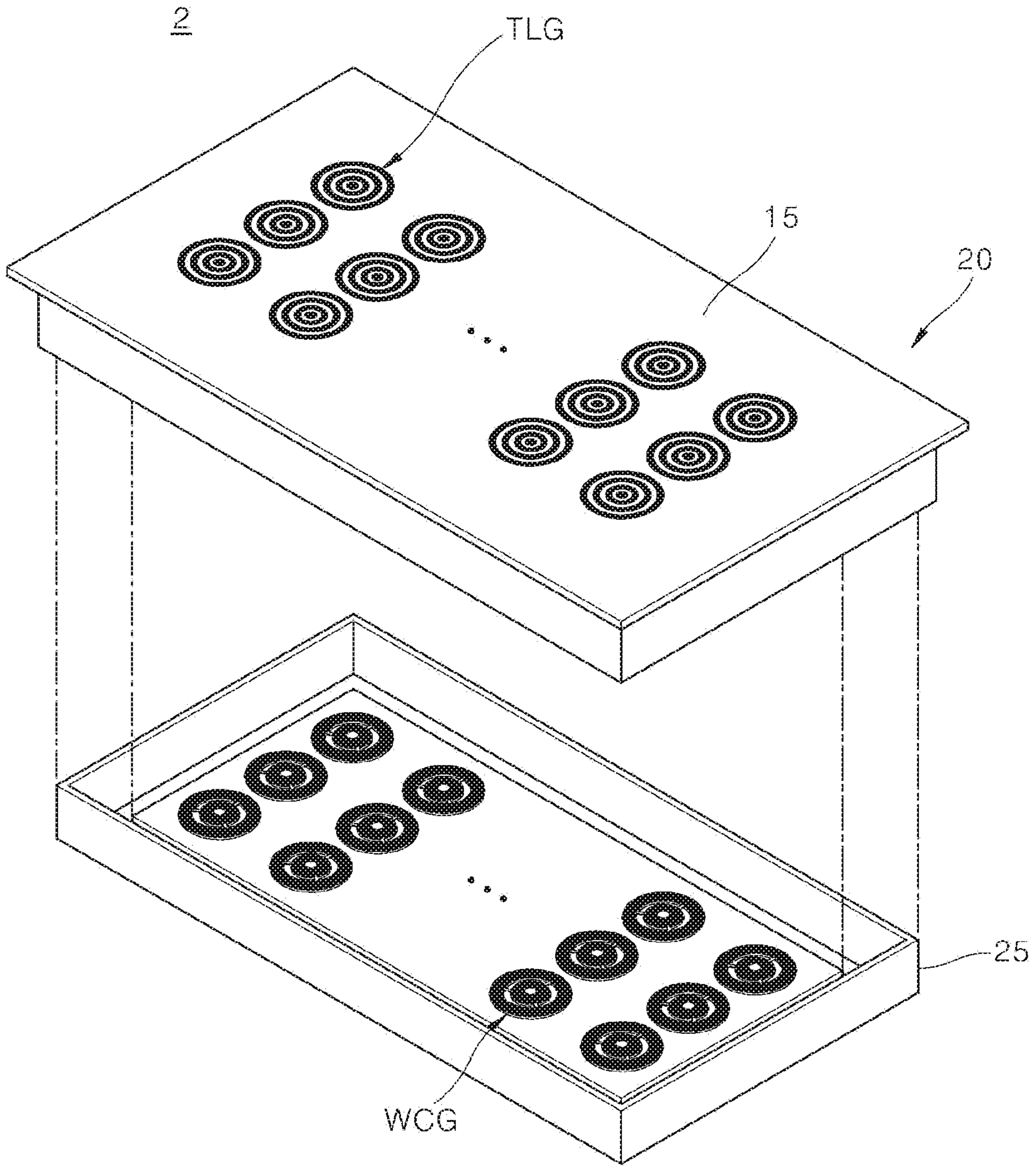
FIG. 7 is a diagram illustrating an example of an induction heating type cooktop.
Figure 8:
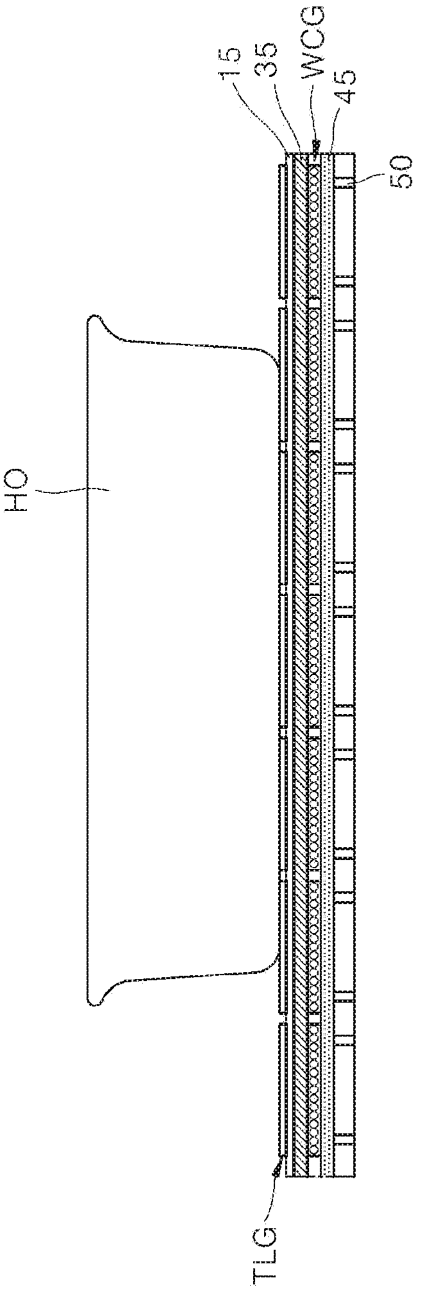
FIG. 8 is a diagram illustrating example elements disposed in an example of a case of the induction heating type cooktop shown in FIG. 7.
Figure 9:
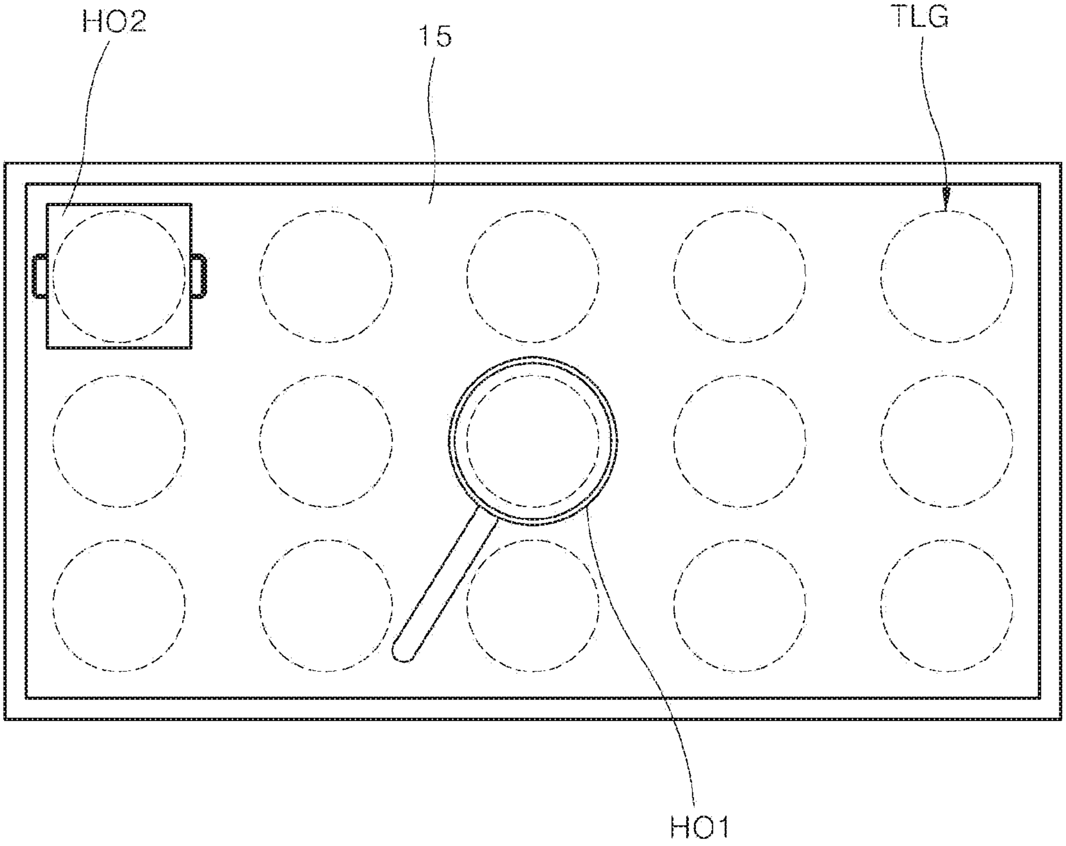
FIG. 9 is a diagram illustrating an example of a target heating object positioned on the induction heating type cooktop shown in FIG. 7.

FIG. 7 is a diagram illustrating an example of an induction heating type cooktop. FIG. 8 is a diagram illustrating example elements provided inside a case of the induction heating type cooktop shown in FIG. 7. FIG. 9 is a diagram illustrating an example of a target heating object positioned at the induction heating type cooktop shown in FIG. 7.

An induction heating type cooktop 2 is identical to the induction heating type cooktop 10 shown in FIG. 1, except for some elements and effects. Hence, a difference compared to the induction heating type cooktop 10 will be focused and described.

Referring to FIGS. 8 and 9, the induction heating type cooktop 2 may be a zone-free cooktop.

Specifically, the induction heating type cooktop 2 may include a case 25, a cover plate 20, a plurality of thin films TLGs, an insulator 35, a plurality of working coils WCGs, a shield plate 45, a support member 50, a cooling fan, a spacer and a control part.

Here, the plurality of thin films TLGs and the plurality of WCGs may overlap in a traverse direction and may be disposed to correspond to each other in a one-to-one relationship. The plurality of thin films TLGs and the plurality of thin films WCGs may be in a many-to-many relationship rather than the one-to-one relationship. In some implementations, for example, the plurality of thin films TLGs and the plurality of working coils WCGs may be arranged in a one-to-one relationship.

For instance, the induction heating type cooktop 2 may be a zone-free cooktop including the plurality of thin films TLGs and the plurality of working coils WCGs, and therefore, it may be possible to heat a single target heating object HO by using some or all of the plurality of working coils WCGs at the same time or by using some or all of the plurality of thin films TLGs at the same time. In some examples, it may be possible to heat the target heating object HO by using both some or all of the plurality of working coils WCG and some or all of the plurality of thin films TLGs.

Accordingly, as shown in FIG. 9, in a region where the plurality of working coils WCG (see FIG. 8) and the plurality of thin films TLG are present (e.g., a region of the upper plate 15), it may be possible to heat target heating objects HO1 and HO2, regardless of sizes, positions, and types of the target heating objects HO1 and HO2.

Figure 10:
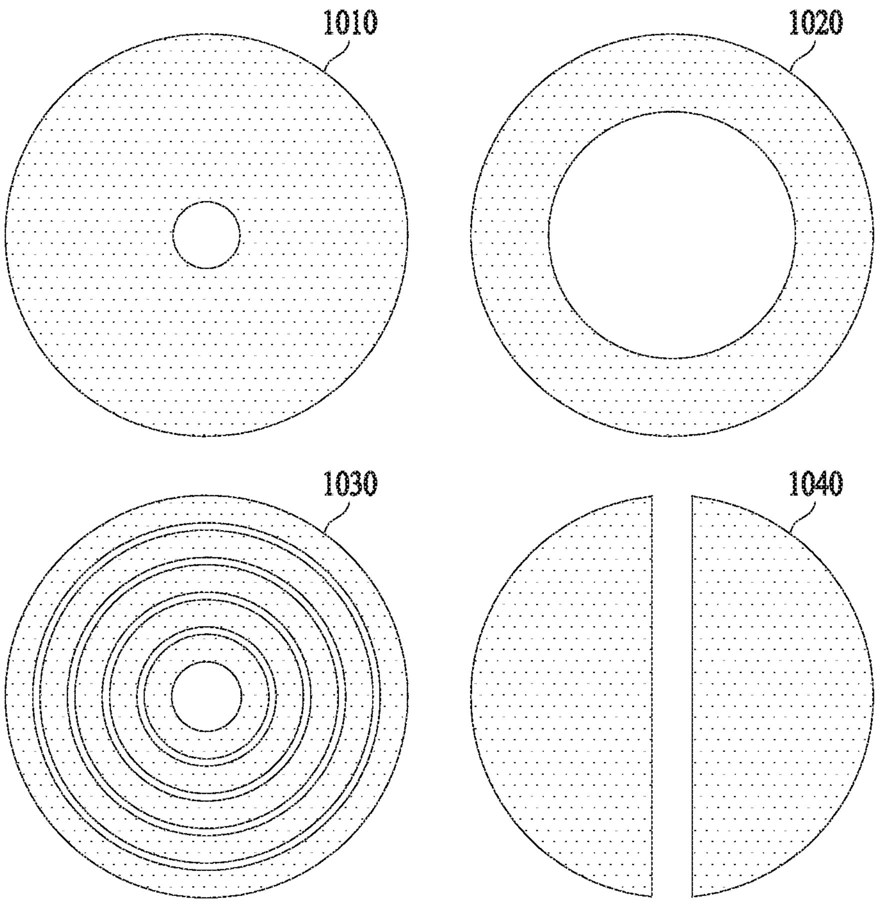
FIG. 10 illustrates various forms of thin films disposed at an upper plate of a cooktop.

FIG. 10 illustrates various forms of a thin film disposed at an upper plate of a cooktop. In some implementations, a thin film may be heated by an induction heating method, and a container (that is, a target heating object HO) disposed at the upper plate 15 is made of a non-magnetic material. Thus, when an induction heated thin film TL is used as the main source of heating to heat the target heating object HO, the thin film TL has a sufficient thickness to secure sufficient inverter control performance. In addition, the heating of the target heating object HO by the induction heated thin film TL is due to heat transfer from the thin film TL. Thus, the wider the area where the thin film TL and the target heating object HO contact each other, the higher efficiency of the target heating object HO. Referring to FIG. 10, heat may be more efficiently conducted from a thin film to a target heating object HO in a thin film shape 1010 having a large area, compared to thin film shapes 1020, 1030, and 1040 each having a smaller area than that of the thin film shape 1010.

In some cases, where the target heating object HO is made of a magnetic material and capable of being directly induction heated, if a thin film TL is in the thin film shape 1010 having a large area, the thin film TL may be at a higher proportion to be induction heated and therefore a temperature increase rate of the thin film TL may increase. When it is detected that a temperature of the thin film TL is heated to or above the limit temperature, the output of the working coil WC may be reduced to maintain stability. If a target heating object HO made of a magnetic material is heated, the temperature of the thin film TL may reach the limit temperature rapidly and hence a process for reducing the output of the working coil WC may be performed. As a result, the heating efficiency of the target heating object HO made of a magnetic material may be undermined. Therefore, in order to improve the heating efficiency of the target heating object HO made of a magnetic material, the thin film TL may have a small area. For example, a small-area thin film shape 1020 in FIG. 10 has a higher efficiency of the object made of a magnetic material than a large-area thin film shape 1020. In the other words, in order to achieve both the heating efficiency of a target heating object HO made of a nonmagnetic material and the heating efficiency of a target heating object HO made of a magnetic material, an appropriate width of the thin film TL should be determined. In addition, it is necessary to optimize a heating mechanism for each material of a target heating object HO based on a shape and a pattern design of the thin film TL.

As an example of a thin film shape for improving heating efficiency, a shape in which a gap is formed between a plurality of thin films TL forming a closed loop (for example, a reference numeral 1030 in FIG. 10) may be used, and accordingly, a heating area of a target heating object HO may be reduced. When the plurality of thin films TL forms the closed loop, the plurality of thin films TL may be coupled with a magnetic field from the working coil WC. Therefore, a large coupling force can be achieved using the plurality of thin films TL each having a narrow width and forming the closed loop. However, since the strength of the magnetic field is not uniform, heat of high temperature may occur in some of the plurality of thin films TL. In addition, as the heating area decreases, the size of a resistance component of an equivalent circuit decreases and the size of an inductance component increases. Further, the absence of heat conduction in a portion where a thin film TL is not present undermines the heating efficiency of a target heating object HO made of a non-magnetic material.

As another example of a thin film shape for improving heating efficiency, a shape (for example, reference numeral 1040 in FIG. 10) in which a closed loop of a current induced in a thin film TL does not to include the central portion of the working coil WC may be used. This shape has a weak coupling force with a magnetic field. Thus, in the case where a thin film TL is formed in the aforementioned shape and a target heating object HO is made of a magnetic material, induction heating of the thin film TL may be induction heated to a degree relatively larger, compared to other thin film shapes 1010, 1020, and 1030. Accordingly, the heating efficiency of the target heating object HO made of the magnetic material may be relatively high for a heating area of the target heating object HO. However, the resistance component of the equivalent circuit formed by a thin film TL may have a small size, and the driving frequency of the working coil WC may tend to become relatively very low compared to the driving frequency of the target heating object HO made of a magnetic material. Accordingly, it may be difficult to perform an appropriate output control.

As such, the heating efficiency of a target heating object HO may be different according to a shape of a thin film TL. The present disclosure proposes an optimal shape of a thin film TL to provide a shape of the thin film TL for increasing the heating efficiency of a target heating object HO made of various materials.

Figure 11:
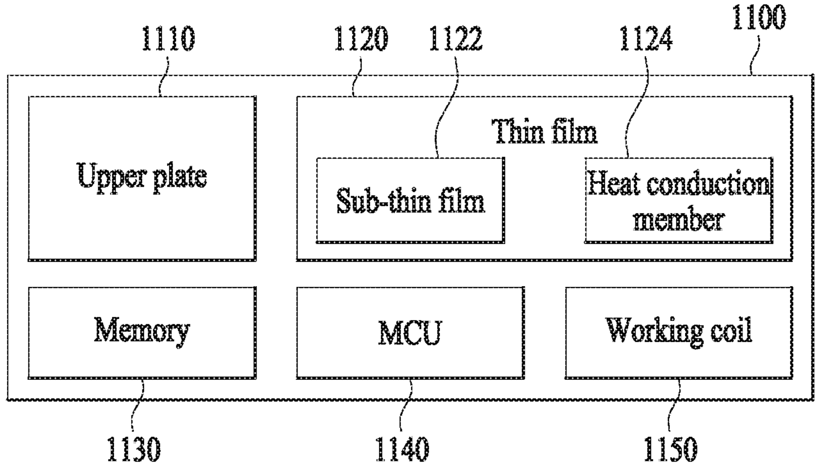
FIG. 11 is a block diagram of an example of an induction heating type cooktop.

FIG. 11 is a block diagram of an example of an induction heating type cooktop.

In some implementations, a cooktop 1100 may include an upper plate 1110 coupled to a top of a case and allowing a target heating object HO to be placed at a top of the upper plate 1110, a working coil 1150 provided inside the case to heat the target heating object HO, and a thin film 1120 disposed at at least one of the top or a bottom of the upper plate 1110. For example, the thin film 1120 may be disposed at one or both of a top surface of the upper plate 1110 and a bottom surface of the upper plate 1110.

In some implementations, the cooktop 1100 may include an insulator provided between a bottom surface of the upper plate 1110 and the working coil 1150.

In some implementations, the thin film 1120 may include a plurality of sub-thin films 1122 forming a closed loop about the central portion of the working coil 1150, and a heat conduction member 1124 disposed in a predetermined pattern to contact at least one of the plurality of sub-thin films 1122. Various shapes available for the thin film 1120 will be described later through various implementations below.

Figure 12:
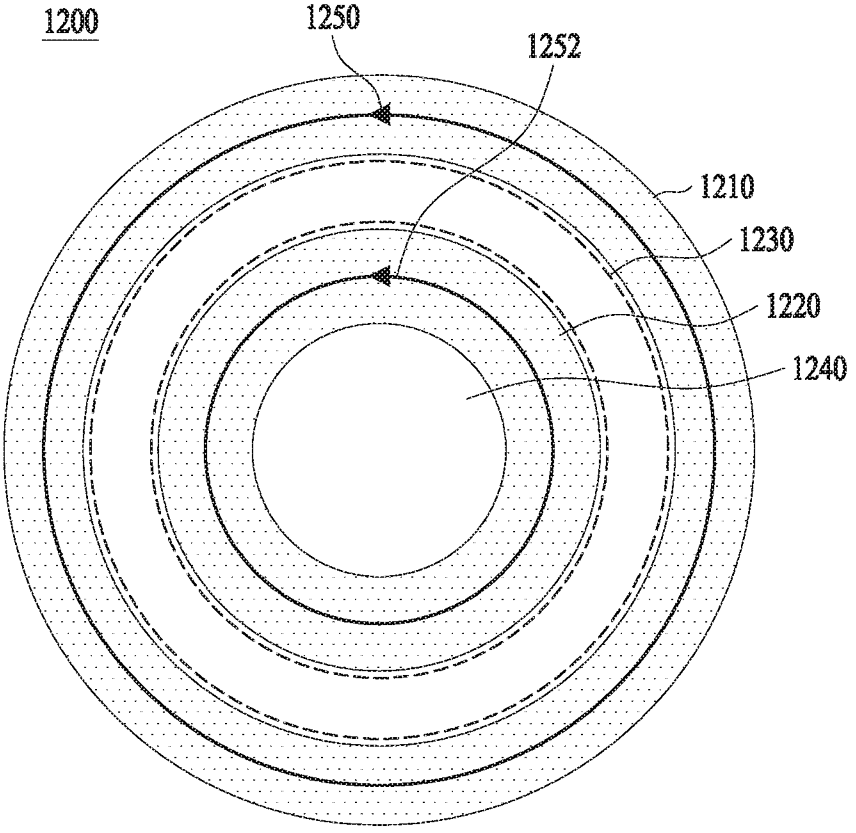
FIG. 12 illustrates an example of sub-thin films included in a thin film of an induction heating type cooktop.

FIG. 12 illustrates an example of a plurality of sub-thin films included in a thin film of an induction heating type cooktop.

In some implementations, a thin film 1200 may be composed of a plurality of sub-thin films 1210 and 1220 capable of being induction heated, and the plurality of sub-thin films 1210 and 1220 may be spaced apart from each other with a gap therebetween. In some implementations, the sub-thin films 1210 and 1220 may form a closed loop about the central portion of a working coil. In some implementations, each of the sub-thin films 1210 and 1220 may have a ring shape such that central portions of the sub-thin films 1210 and 1220 overlap each other. Here, the central portion may be defined as a central portion of each sub-thin film formed in various polygonal shapes (for example, a portion at which at least one of a horizontal length and a vertical length of a corresponding sub-thin film is in half) that can be understood by those skilled in the art. Referring to FIG. 12, each of the plurality of sub-thin films 1210 and 1220 constituting the thin film 1200 is depicted as a circular ring shape. In this case, the central portion of each of the plurality of sub-thin films 1210 and 1220 may be understood as the central portion of the circular ring shape. However, the shape of the plurality of sub-thin films 1210 and 1220 are not necessarily limited to the shape shown in FIG. 12 and may be understood as any of various shapes that can form a closed loop with a predetermined area.

Referring to FIG. 12, in some implementations, the thin film 1200 may be composed of two sub-thin films 1210 and 1220 each having a ring shape, and the sub-thin films 1210 and 1220 may be spaced apart from each other with a gap formed therebetween. For instance, the sub-thin films 1210 and 1220 constituting the thin film 1200 may have a shape in which a hollow portion is formed.

In some implementations, a sub-thin film arranged at the innermost among the plurality of sub-thin films 1210 and 1220 constituting the thin film 1200 may have a disc shape in which a hole is formed in a central portion. That is, the thin film 1200 may be composed of a plurality of thin films including a sub-thin film in which no hole is formed in the central portion.

In some implementations, induction currents (that is, eddy currents) 1250 and 1252 may flow in the sub-thin films 1210 and 1220 included in the thin film 1200 by a magnetic field generated by the working coil 1150. Such induced currents may flow along a closed loop formed by the sub-thin films 1210 and 1220.

In some implementations, the thin film 1200 may include a heat conduction member that contacts the sub-thin films 1210 and 1220. In some implementations, the heat conduction member may be arranged in various patterns to contact the sub-thin films 1210 and 1220. In some implementations, the heat conduction member may be arranged in a gap 1230 between the sub-thin films 1210 and 1220. In some implementations, the heat conduction member may be arranged in the gap 1230 between the sub-thin films 1210 and 1220 and may also contact the sub-thin films 1210 and 1220 to be arranged at a portion where the sub-thin films 1210 and 1220 are not present in the upper plate 1110.

Figure 13:
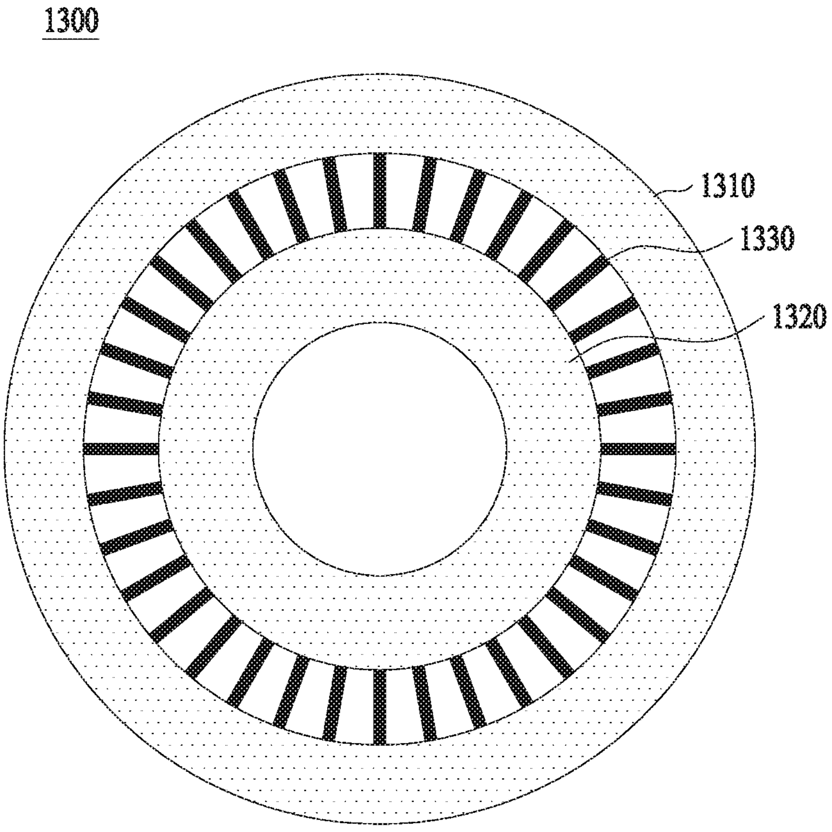
FIG. 13 illustrates an example of a thin film including a plurality of sub-thin films and a heat conduction member.

FIG. 13 illustrates an example of a thin film 1300 including a plurality of sub-thin films 1310 and 1320 and a heat conduction member 1330.

In some implementations, the thin film 1300 may include a plurality of sub-thin films 1310 and 1320 forming a closed loop about the central portion of a working coil 1150, and a heat conduction member 1330 disposed in a predetermined pattern to contact at least one of the plurality of sub-thin films 1310 and 1320 (e.g., various types of comb patterns, toothed or comb-like patterns). For example, a comb pattern may include a body portion (e.g., the sub-thin film 1320) and a plurality of straight or linear patterns (radial connections or extensions; e.g., the heat conduction member 1330) that are spaced apart from another and extend radially outward from the body portion (e.g., sub-thin film 1320). In some examples, a comb pattern may include a body portion (e.g., the sub-thin film 1520) and a plurality of curved patterns (radial connections or extensions; e.g., the heat conduction member 1530) that are spaced apart from another and extend radially outward from the body portion (e.g., sub-thin film 1520).

Referring to FIG. 13, the heat conduction member 1330 may be arranged in a gap between the plurality of sub-thin films 1310 and 1320 forming the closed loop. In FIG. 13, the heat conduction member 1330 is illustrated as in contact with all the plurality of sub-thin films 1310 and 1320. However, the heat conduction member 1330 may contact at least one of the plurality of sub-thin films 1310 and 1320, and accordingly, heat may be conducted from the at least one of the plurality of sub-thin films 1310 and 1320 that are induction heated. In some implementations, the plurality of sub-thin films 1310 and 1320 and the heat conduction member 1330 may be made of the same material.

For example, the heat conduction member 1330 may include a plurality of radial connections arranged in a circumferential direction and spaced apart from one another in the circumferential direction, where each of the plurality radial connections extends in a radial direction between the plurality of sub-thin films 1310 and 1320. In some examples, each of the plurality of radial connections may connect to the plurality of sub-thin films in the radial direction and directly contact at least one of the plurality of sub-thin films. In some cases, each of the plurality of radial connections may have a linear shape parallel to the radial direction. In some cases, each of the plurality of radial connections has a curved shape (e.g., spiral shape) extending in the circumferential direction and the radial direction between the plurality of sub-thin films 1310 and 1320.

In some examples, a radial length of each of the plurality of radial connections may be less than or equal to a distance between the plurality of sub-thin films.

In some implementations, the heat conduction member 1330 may be arranged at a position where a magnetic field generated by the working coil 1150 is equal to or greater than a predetermined threshold. In some implementations, the magnetic field generated by the working coil 1150 may vary in size in a radial direction.

The cooktop 1100 may operate the working coil 1150 to induction heat a magnetic object HO placed at the upper plate 1110. In addition, even in the case where a non-magnetic object HO is placed at the upper plate 1110, the cooktop 1100 may indirectly heat the non-magnetic object HO as the thin film 1120 is capable of being induction heated. That is, the thin film 1120 may be made of a predetermined material that can be induction heated, and accordingly, the thin film 1120 may be induction heated in the process of induction heating of a target heating object HO placed at the upper plate 1110. Here, the target heating object HO to be indirectly heated through the induction heated thin film 1120 may be heated faster as the thin film 1120 is larger in area and smaller in thickness. A heating area of the target heating object HO may correspond to the entire area in which a physical configuration constituting the thin film 1120 faces the target heating object HO.

In the thin film 1220 capable of being induction heated, a heat distribution of a portion to be heated may be determined according to a shape of the thin film 1220. For example, when the thin film 1120 has a ring shape that forms a loop, the heat distribution of the thin film 1120 may change in a circumferential direction CD and a radial direction RD of the loop. In particular, in an induction heated thin film 1120 having a ring shape, portions to be heated to the highest temperature and the lowest temperature may exist within a predetermined radius range. The difference in temperature of the thin film 1120 may cause thermal deformation of a single component included in the thin film 1120.

The reason why the heat distribution of the thin film 1120 is not uniform is that there is a portion in which a magnetic field generated by the working coil 1150 is concentrated. In some implementations, the magnetic field generated by the working coil 1150 may be concentrated vertically above the central portion of the working coil 1150 in the radial direction.

As described above with reference to FIG. 10, if a thin film is formed as a ring-shaped single film like the thin film 1010, a non-uniform magnetic field may be generated. In this case, the central portion of the thin film in a radial direction may be induction heated to the highest temperature and other portions adjacent to the inner boundary or the outer boundary may be heated to a relatively low temperature. In some implementations, in order to prevent thermal deformation caused by a difference in heating temperature of the thin film 1220, the plurality of sub-thin films 1310 and 1320 may be disposed at a portion where the magnetic field is less than a predetermined threshold. In some implementations, the heat conduction member 1330 may be disposed at a portion where the magnetic field is equal to or greater than the predetermined threshold. As described above, as the plurality of sub-thin films 1310 and 1320 is disposed at a portion other than the portion where the magnetic field is concentrated, the plurality of sub-thin films 1310 and 1320 may not be rapidly induction heated at a certain portion but heat may be distributed relatively uniformly. In addition, the heat from the plurality of sub-thin films 1310 an 1320 may be conducted to the heat conduction member 1330.

In some implementations, the plurality of sub-thin films 1310 and 1320 may be spaced apart from each other with a gap of a predetermined threshold distance or more in the radial direction. In some implementations, the predetermined threshold distance may be a distance that is set to perform heating adaptively to both a target heating object HO made of a magnetic material and a target heating object HO made of a non-magnetic material. Using the predetermined threshold distance, it is possible to improve the heating efficiency of a target heating object HO made of various materials.

In some implementations, the predetermined threshold distance may be predetermined as a value of an absolute distance. In some implementations, the predetermined threshold distance may be predetermined as a relative ratio to widths of the sub-thin films 1310 and 1320 in the radial direction. In some implementations, the widths of the sub-thin films 1310 and 1320 may be 1.3 cm and 3 cm, and a gap between the sub-thin films 1310 and 1320 may be 2.2 cm. In some implementations, an inner sub-thin film 1320 among the sub-thin films 1310 and 1320 may include a hollow portion, and the hollow portion may have a diameter of 7 cm. In some implementations, the predetermined threshold distance may be predetermined as the absolute value or relative ratio described above. However, the numerical values in the above-described implementations are merely examples for convenience of explanation, and the numerical values may be changed within an appropriate range according to a specific shape of the thin film 1300.

Figure 14A:
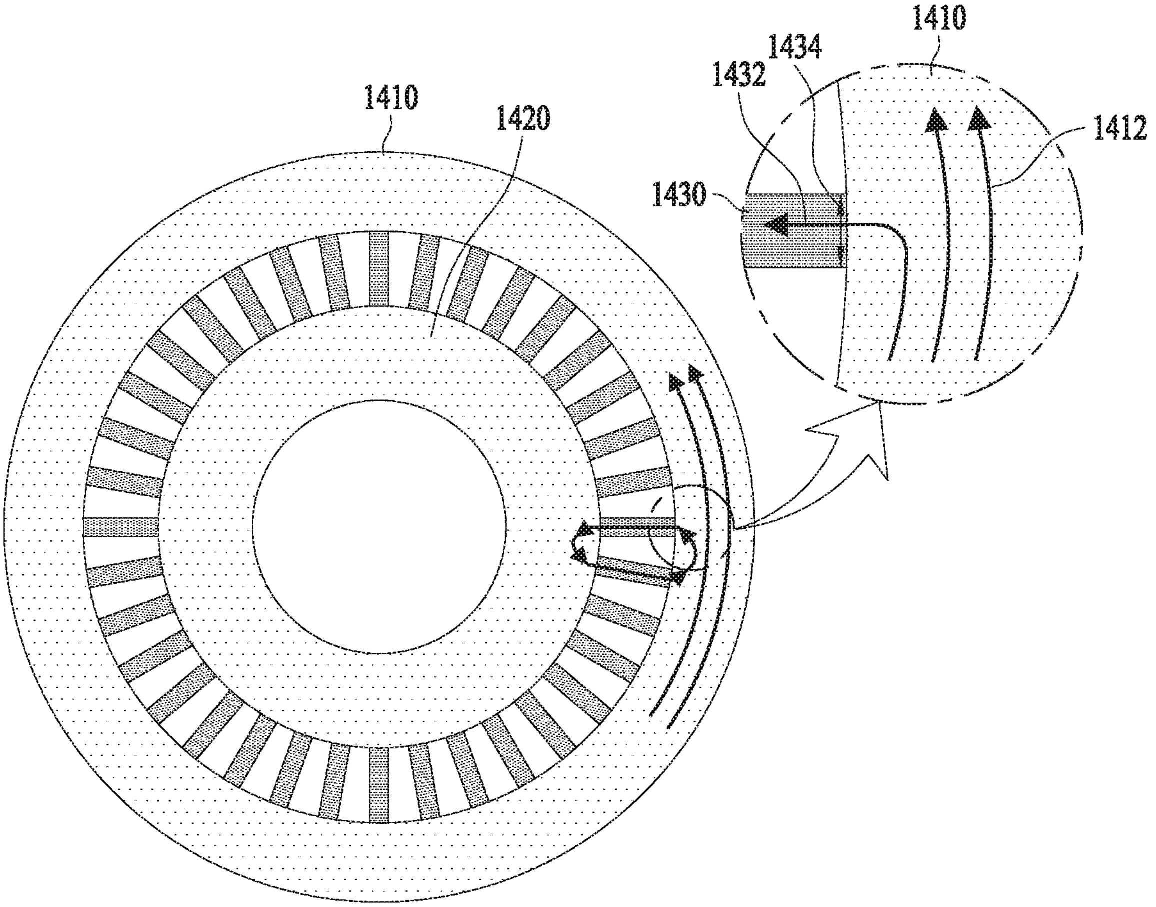
FIGS. 14A and 14B illustrate examples where a current induced in a sub-thin film is limited or does not flow through a heat conduction member to another sub-thin film due to a width of the heat conduction member.
Figure 14B:
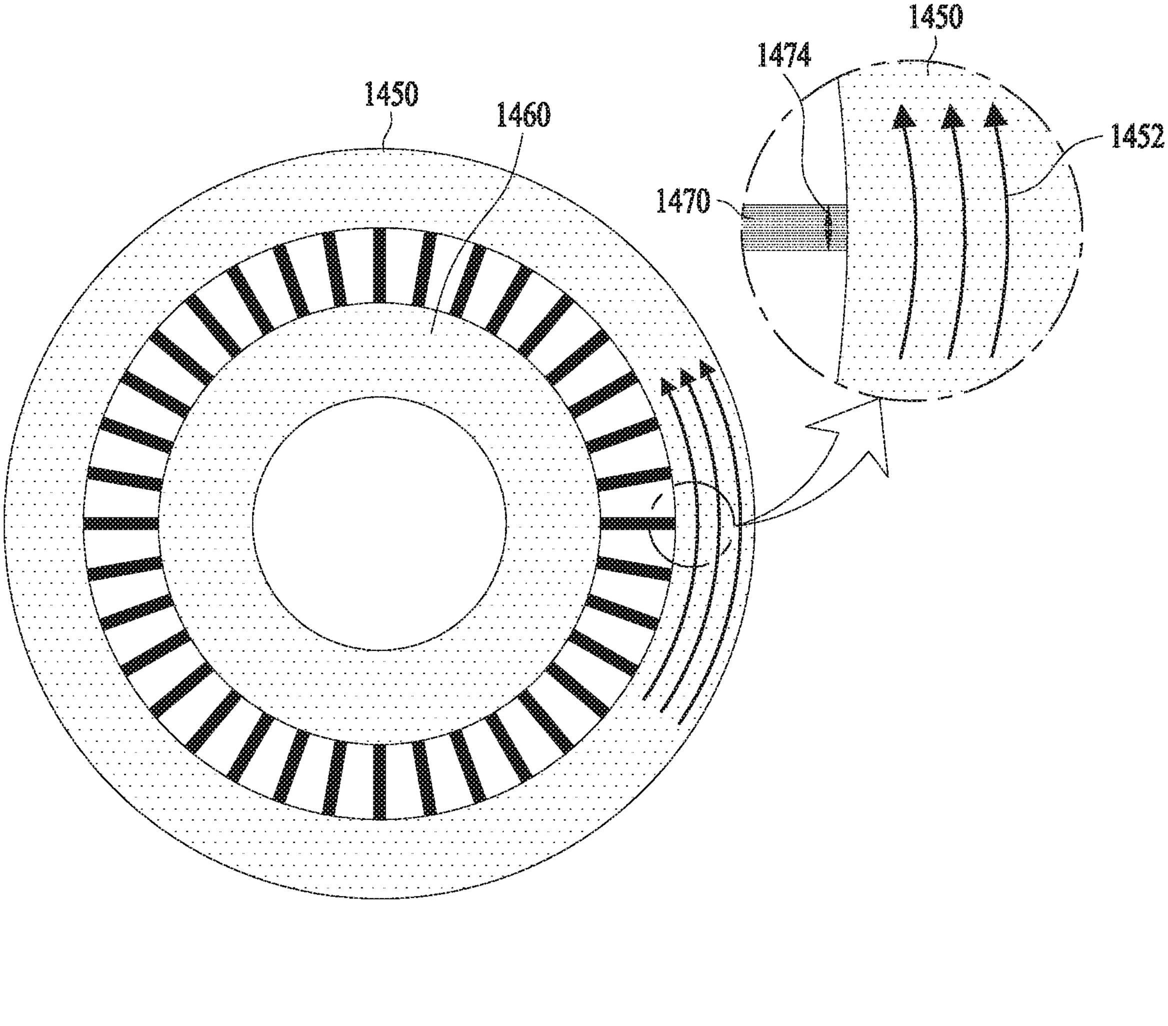

FIGS. 14A and 14B illustrate an example case where that a current induced in a sub-thin film 1122 may be limited or may not flow through a heat conduction member 1124 to another sub-thin film 1122 due to a width of the heat conduction member 1124.

In some implementations, the heat conduction member 1124 may have a width equal to or less than a predetermined threshold width, so that the magnitude of a current flowing in the heat conduction member 1124 by a current induced in the plurality of sub-thin films 1122 becomes equal to or less than a predetermined threshold current level. Even if the heat conduction member 1124 is made of a material through which electricity can flow, the degree to which the current induced in the sub-thin films 1122 is transmitted to the heat conduction member 1124 may vary according to a width of the heat conduction member 1124.

In some implementations, the thin film 1120 may have a width equal to or less than a predetermined threshold width. The predetermined threshold width may be designed such that a current induced from the sub-thin films 1122 can be limited from flowing to the heat conduction member 1124 or a current equal to or greater than a predetermined magnitude can flow to the heat conduction member 1124. In some examples, a width of the heat conduction member 1124 may be included in a range of 1 mm to 5 mm.

Referring to FIG. 14A, the thin film 1120 may include sub-thin films 1410 and 1420 and a heat conduction member 1430. In some implementations, an induced current 1412 may flow in the sub-thin films 1410 and 1420 by a magnetic field generated by the working coil 1150. In some implementations, when the heat conduction member 1430 has a width 1434 exceeding a predetermined threshold width, a leakage current 1432 from the induced current 1412 flowing in the sub-thin films 1410 and 1420 may flow to the heat conduction member 1430 and the leakage current 1432 may have a magnitude exceeding a predetermined threshold current level.

In some cases, when the leakage current 1432 exceeding the predetermined threshold current level flows in the heat conduction member 1430, a closed loop may be formed by the leakage current 1432 flowing in the heat conduction member 1430, and the closed loop may affect the magnetic field passing through the thin film 1120. In some implementations, the closed loop formed by the leakage current 1432 may prevent the magnetic field generated by the working coil 1150 from reaching a target heating object HO, thereby undermining the heating efficiency of induction heating of the target heating object HO.

In FIG. 14B, in some implementations, an induced current 1452 may flow in sub-thin films 1450 and 1460 by a magnetic field generated by the working coil 1150. For example, when the heat conduction member 1470 has a width 1474 equal to or less than a predetermined threshold width, the induced current 1452 flowing in the sub-thin films 1450 and 1460 may not flow in the heat conduction member 1470 or only a leakage current 1432 equal to or less than a predetermined threshold current level may flow in the heat conduction member 1470. When the leakage current 1432 does not flow in the heat conduction member 1470 or when the leakage current 1432 equal to or less than the predetermined threshold current level flows in the heat conduction member 1470, a closed loop may not be formed by the leakage current 1432 or may be weakly formed.

In some examples, a magnetic field generated by the working coil 1150 may affect a target heating object HO very slightly. That is, by controlling the magnetic field generated by the working coil 1150 not to flow in a portion where the heat conduction member 1430 is present or by controlling only a current equal to or less than the predetermined threshold current level to flow in the aforementioned portion, it is possible to allow the magnetic field generated by the working coil 1150 to reach the target heating object HO by passing through the portion where the sub-thin films 1450 and 1460 are not present. Accordingly, the heating efficiency of induction heating of a magnetic object HO may be relatively higher than that of the example in FIG. 14A.

Figure 15A:
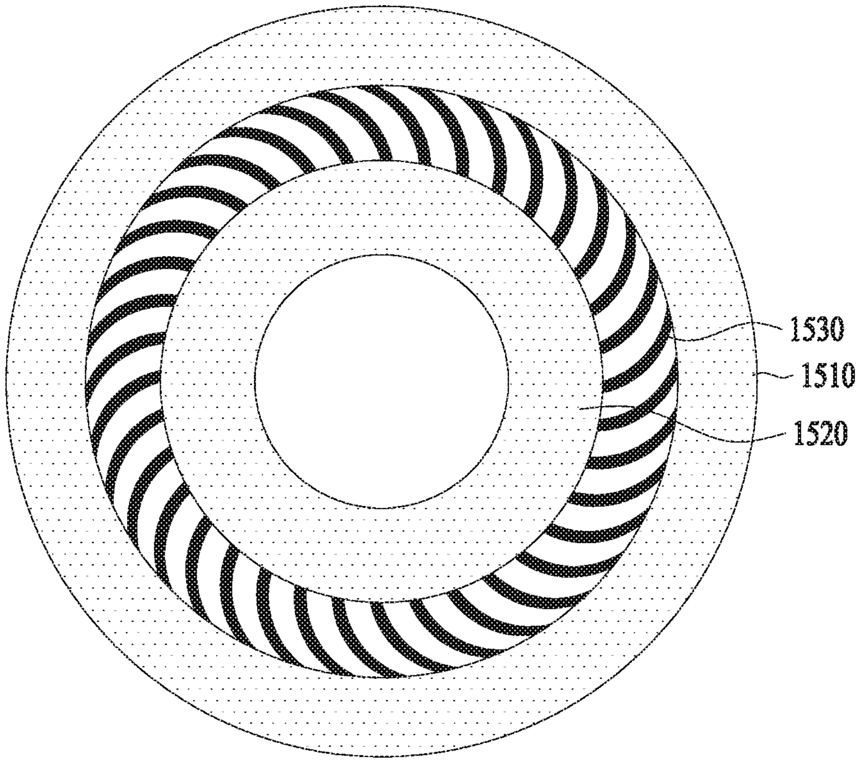
FIGS. 15A, 15B, and 15C illustrate various example shapes of a heat conduction member.
Figure 15B:
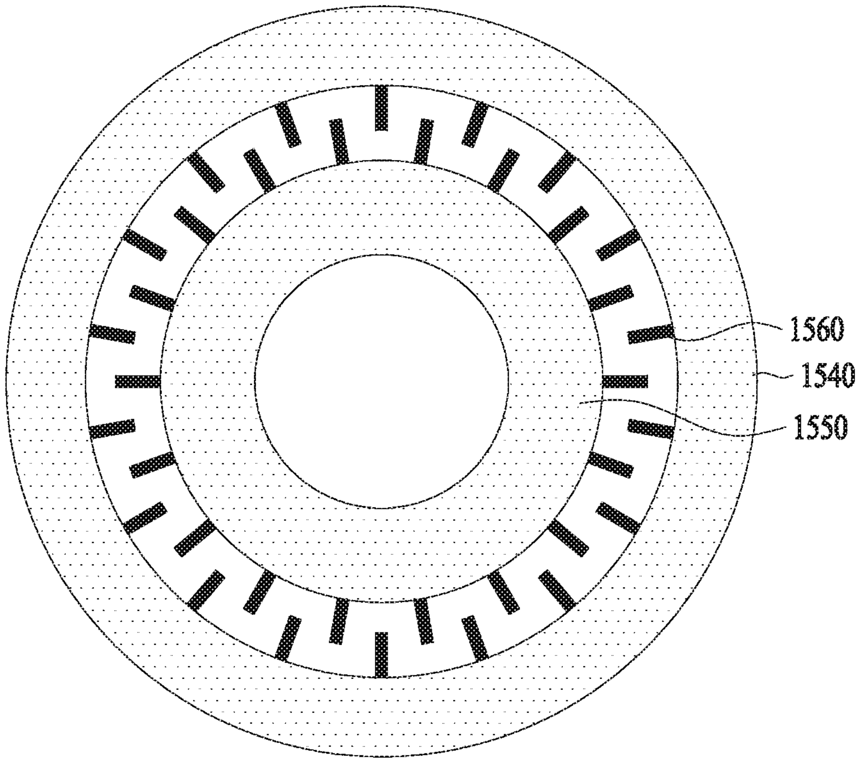
Figure 15C:
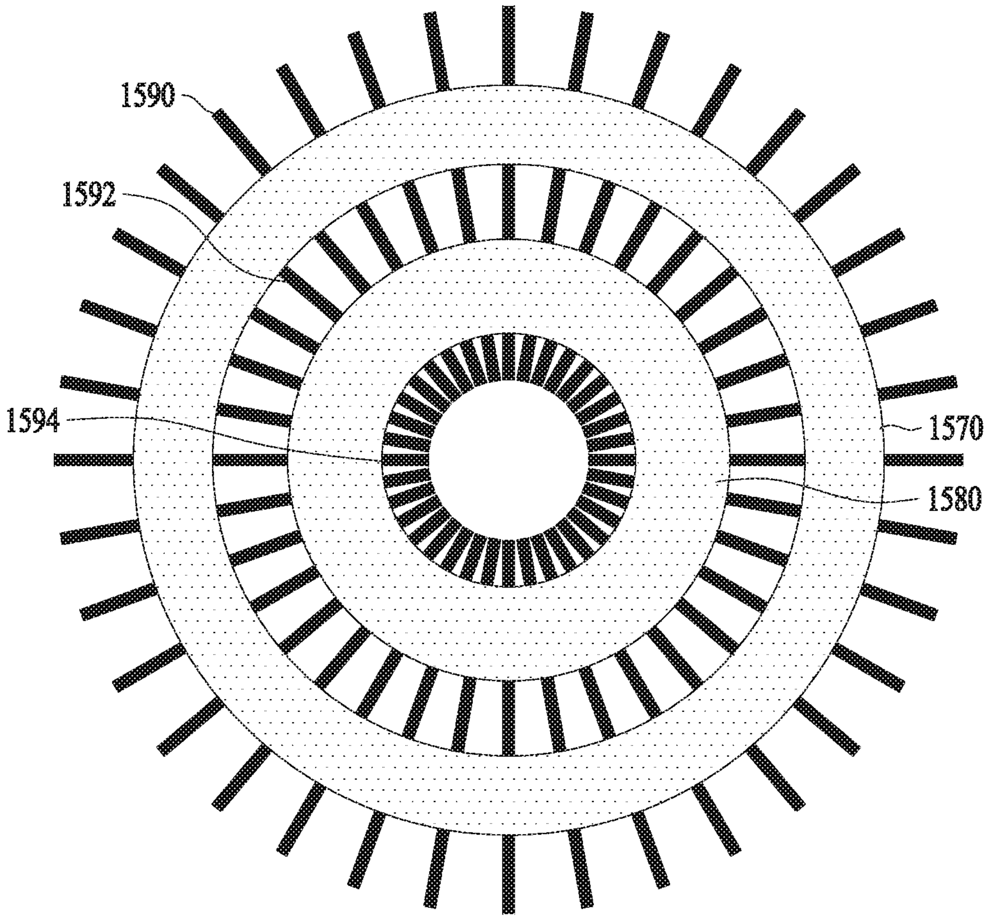

FIGS. 15A, 15B, and 15C illustrate various example shapes of a heat conduction member.

In some implementations, the heat conduction member 1124 may be disposed in a predetermined pattern to contact at least one of the plurality of sub-thin films 1122.

Referring to FIG. 15A, in some implementations, a heat conduction member 1530 may be disposed to contact a plurality of sub-thin films 1510 and 1520. For example, the pattern of the heat conduction member 1530 may be a pattern in which the plurality of sub-thin films 1510 and 1520 and the heat conduction member 1530 are arranged obliquely. In some implementations, the heat conduction member 1530 may contact the sub-thin films 1510 and 1520 with a width that is set such that an induced current equal to or less than a predetermined threshold current level flows from the sub-thin films 1510 and 1520.

In some implementations, the heat conduction member 1530 may be able to heat a target heating object HO with heat conducted from the sub-thin films 1510 and 1520. In order to increase an area to contact the target heating object HO, the heat conduction member 1530 may be arranged in various patterns. For example, in the case where each heat conduction member 1124 has a line shape, the area where the heat conduction member 1530 and a target heating object HO contact each other may be large when the heat conduction member 1530 is arranged obliquely to the sub-thin films 1510 and 1520 as shown in FIG. 15A, compared to when the heat conduction member 1330 is disposed to vertically contact the sub-thin films 1310 and 1320 as shown in FIG. 13. Accordingly, even a portion of the target heating object HO, which is in contact with a region where the sub-thin films 1510 and 1520 are not present, may be heated relatively uniformly.

Referring to FIG. 15B, in some implementations, the heat conduction member 1560 may be disposed in a predetermined pattern to contact one of the plurality of sub-thin films 1540 and 1550.

In some implementations, the heat conduction member 1560 may be disposed to contact one of the plurality of sub-thin films 1540 and 1550, and the heat conduction member 1560 may be part of the plurality of sub-thin films 1540 and 1550. For example, all the plurality of sub-thin films 1540 and 1550 may be in contact with the heat conduction member 1560 in the example in FIG. 15B. In some examples, a different pattern of arrangement where only some of the plurality of sub-thin films 1540 and 1550 are in contact with the heat conduction member 1560 may be used.

For example, the heat conduction member 1560 may include a plurality of first radial connections that extend radially outward from an inner sub-thin film 1550, and a plurality of second radial connections that extend toward the inner sub-thin film 1550 from an outer sub-thin film 1540. In some examples, the plurality of first radial connections and the plurality of second radial connections are alternately arranged along the circumferential direction. For instance, each of the plurality of first radial connections may be disposed between two of the plurality of second radial connections.

Referring to FIG. 15C, heat conduction members 1590, 1592, and 1594 may be arranged not only in a gap between a plurality of sub-thin films 1570 and 1580 each forming a closed loop, but also in a different space other than the gap between the plurality of sub-thin films 1570 and 1580. In some implementations, the heat conduction members 1590, 1592, and 1594 may include a heat conduction member 1592 arranged in the gap between the plurality of sub-thin films 1570 and 1580, and heat conduction members 1590 and 1594 arranged at portions other than the gap between the plurality of sub-thin films 1570 and 1580.

FIGS. 16A, 16B, 16C, and 16D illustrate various example shapes in which the thin film 1120 is disposed at an upper plate.

Figure 16A:
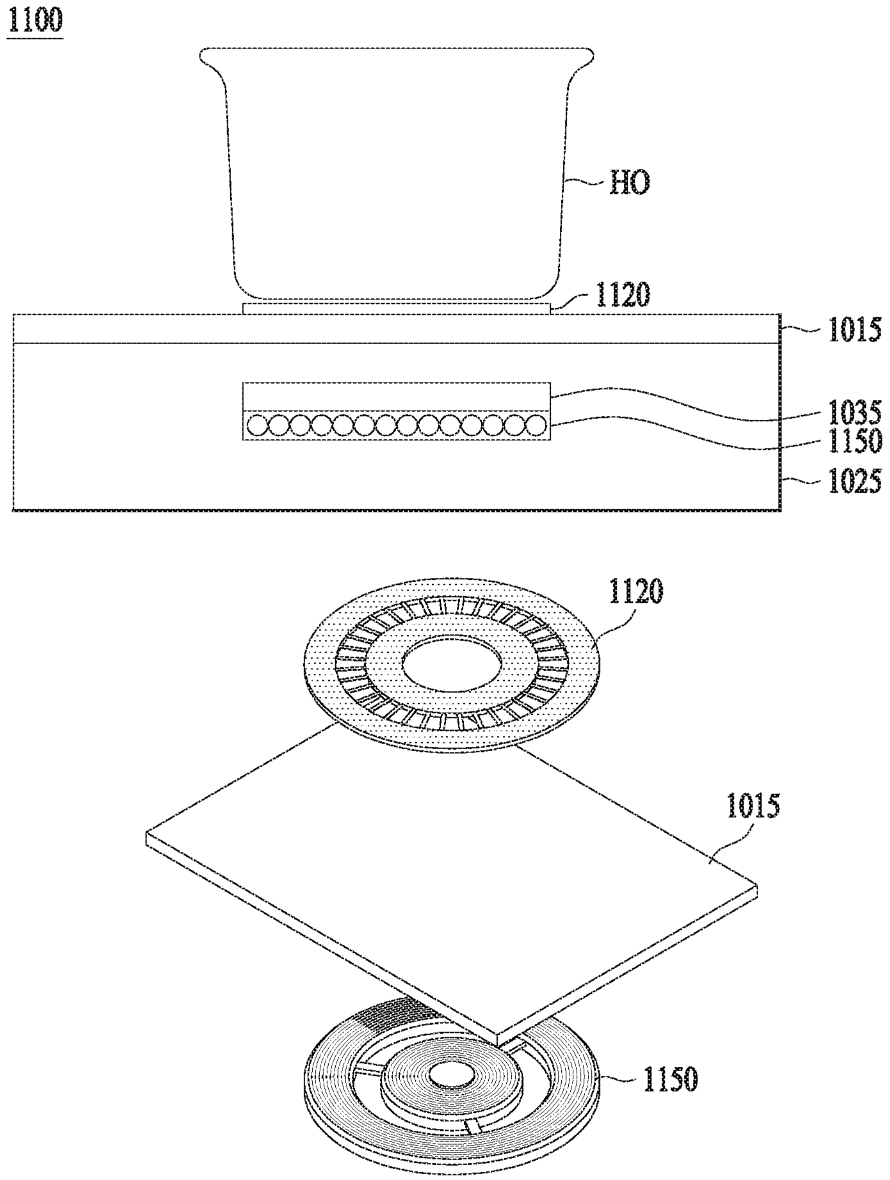
FIGS. 16A, 16B, 16C, and 16D illustrate various example shapes of a thin film disposed at an upper plate of an induction heating type cooktop.

An induction heating type cooktop 1100 used in the description from FIG. 16A may correspond to the induction heating type cooktop 1 used in various examples described above with reference to FIGS. 1 to 9. Accordingly, it is understood that components of the induction heating type cooktop 1100 may include the components of the cooktop 1 within the scope supported by FIGS. 1 to 9 and the description thereof.

In some implementations, a thin film 1120 shown in FIGS. 16A to 16D may have a shape corresponding to some of various shapes of the thin film 1120 described above through the various examples.

Referring to FIG. 16A, an induction heating type cooktop 1100 may include an upper plate 1015 coupled to a top of a case 1025 and allowing a target heating object HO to be placed at a top of the upper plate 1015, a working coil 1150 provided inside the case 1025 to heat the target heating object HO, a thin film 1120 coated over the upper plate 1015, and an insulator 1035 provided between a bottom of the upper plate 1015 and the working coil 1150.

Figure 16B:
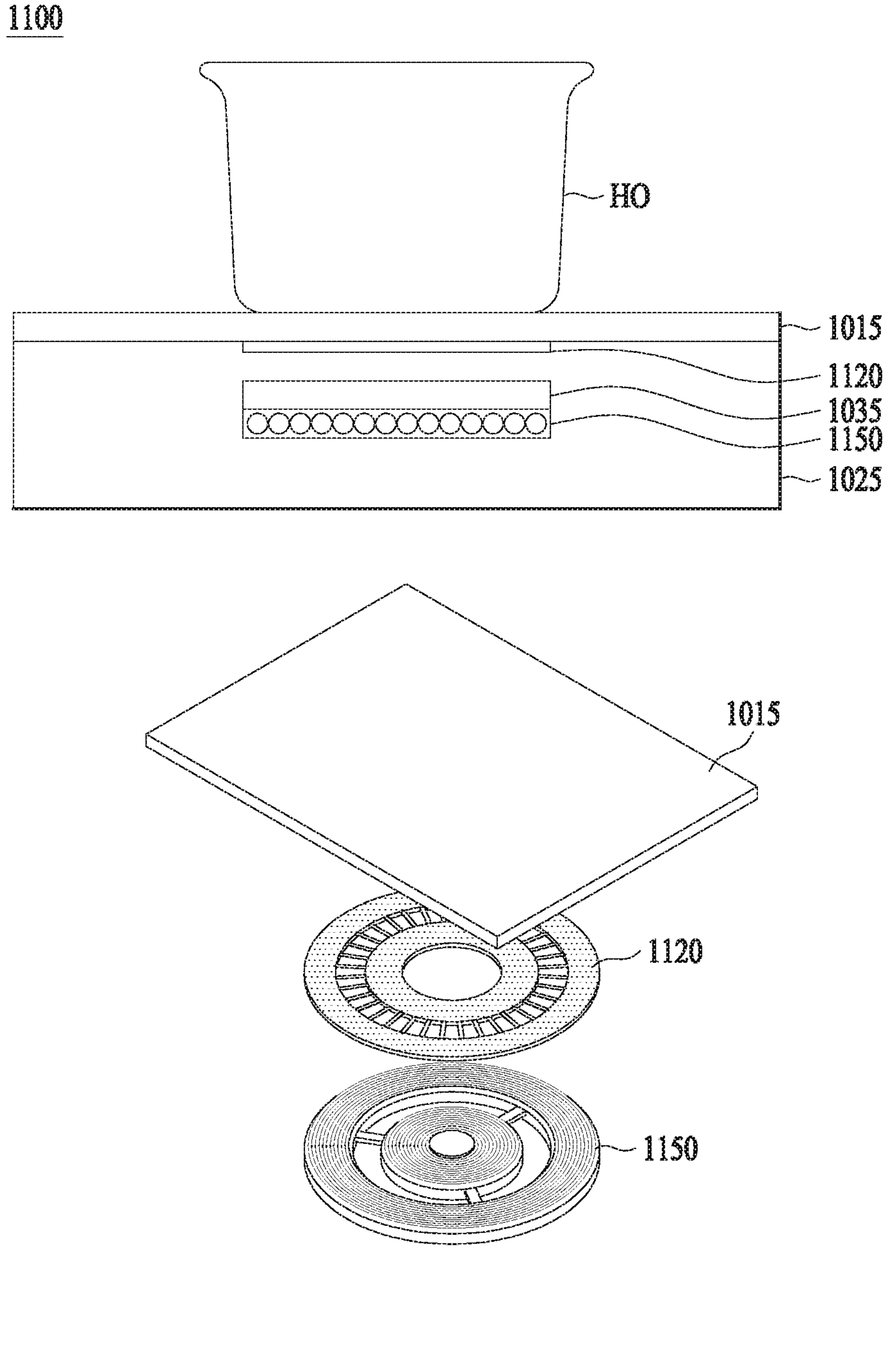

Referring to FIG. 16B, the thin film 1120 may be disposed at the bottom of the upper plate 1015 rather than at the top of the upper plate 1015. In some implementations, the thin film TL may be in contact with the bottom of the upper plate 1015 or may form part of the bottom surface of the upper plate 1015 to reduce a gap caused by the thin film 1120. In some implementations, the thin film 1120 may not be disposed at the top surface of the upper plate 1015 and thus not exposed to the outside and instead may be disposed at the bottom surface of the upper plate 1015 in various manners.

Figure 16C:
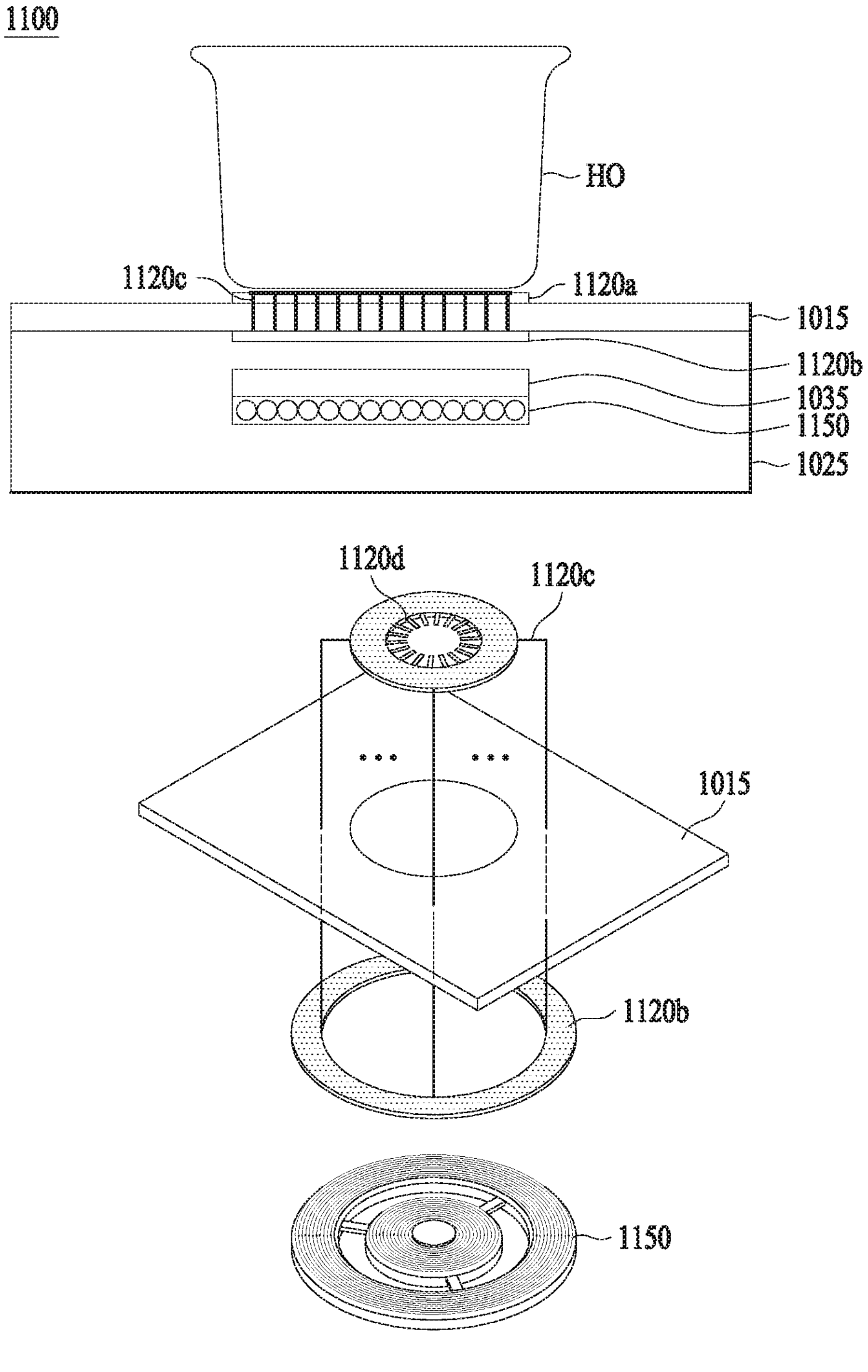

FIG. 16C illustrates that a thin film 1120 including a plurality of sub-thin films 1120*a* and 1120*b* is disposed at the top and the bottom of the upper plate 1015.

In some implementations, the thin film 1120 may include a plurality of sub-thin films 1120*a* and 1120*b* to be induction heated, and the thin film 1120 may be disposed at the top and the bottom of the upper plate 1015. In some implementations, the thin film 1120 may include a heat conduction member 1120*c* connected to at least one of the plurality of sub-thin films 1120*a* and 1120*b* and the plurality of sub-thin films 1120*a* and 1120*b*. In some implementations, since the plurality of sub-thin films 1120*a* and 1120*b* is disposed at the top and bottom of the upper plate 1015, when the heat conduction member 1120*c* is in contact with two or more sub-thin films 1120*a* and 1120*b* among the plurality of sub-thin films 1120*a* and 1120*b*, the heat conduction member 1120*c* may be disposed to contact the plurality of sub-thin films 1120*a*, 1120*b* through the upper plate 1015. In some implementations, a heat conduction member (e.g., 1120*d*) in contact with one sub-thin film 1120*a* or 1120*b* in the plurality of sub-thin films 1120*a* and 1120*b* may be disposed at the top or the bottom of the upper plate 1015 without passing through the upper plate 1015.

In some implementations, the cooktop 1100 may have a thin film 1120 including the plurality of sub-thin films 1120*a* and 1120*b* and disposed at the top and bottom of the upper plate 1015. Referring to FIGS. 2 and 3, the first and second thin films TL1 and TL2 may be induction heated by the working coils WC1 and WC2, respectively. In this example, the sub-thin films 1120*a* and 1120*b* may be induction heated together by one working coil 1150. In some cases, the sub-thin films 1120*a* and 1120*b* may be arranged in a vertical direction.

In some implementations, the sub-thin films 1120*a* and 1120*b* disposed at the top and the bottom of the upper plate 1015 may be coated over the top surface and the bottom surfaces of the upper plate 1015, and the coating method may be any of various methods including vacuum deposition and the like. In some examples, the cooktop 110 may further include a layer made of a material that may be heated by induction and at least one additional layer (an adhesive layer or a protective layer) to be disposed at the top and the bottom of the upper plate 1015.

In some implementations, the sub-thin films 1120*a* and 1120*b* disposed at the top and the bottom of the upper plate 1015 may be disposed at the upper plate 1015 in the same structure. In some implementations, the structures of the sub-thin films 1120*a* and 1120*b* disposed at the top and the bottom of the upper plate 1015 may be different from each other. For example, a sub-thin film 1120*a* disposed at the top of the upper plate 1015 may be protected by a protective layer, and a thin film 1120*b* disposed at the bottom of the upper plate 1015 may not be protected by any protective layer or may be protected by a protective layer different from the protective layer that protects the thin film 1120*a* disposed at the top of the upper plate 1015.

In some implementations, the sub-thin films 1120*a* and 1120*b* disposed at the top and the bottom of the upper plate 1015 may have different shapes at the top and the bottom of the upper plate 1015. In some implementations, the number of sub-thin films 1120*a* disposed at the top and the number of sub-thin films 1120*b* disposed at the bottom may be different. In some implementations, sub-thin films 1120*a* disposed at the top of the upper plate 1015 and sub-thin films 1120*b* disposed at the bottom of the upper plate 1015 may be the same in number but have different shapes. Specific shapes (e.g., a width or a gap) available for the sub-thin films 1120*a* and 1120*b* may be varied within the scope obvious to by those skilled in the art through various examples described above.

Figure 16D:
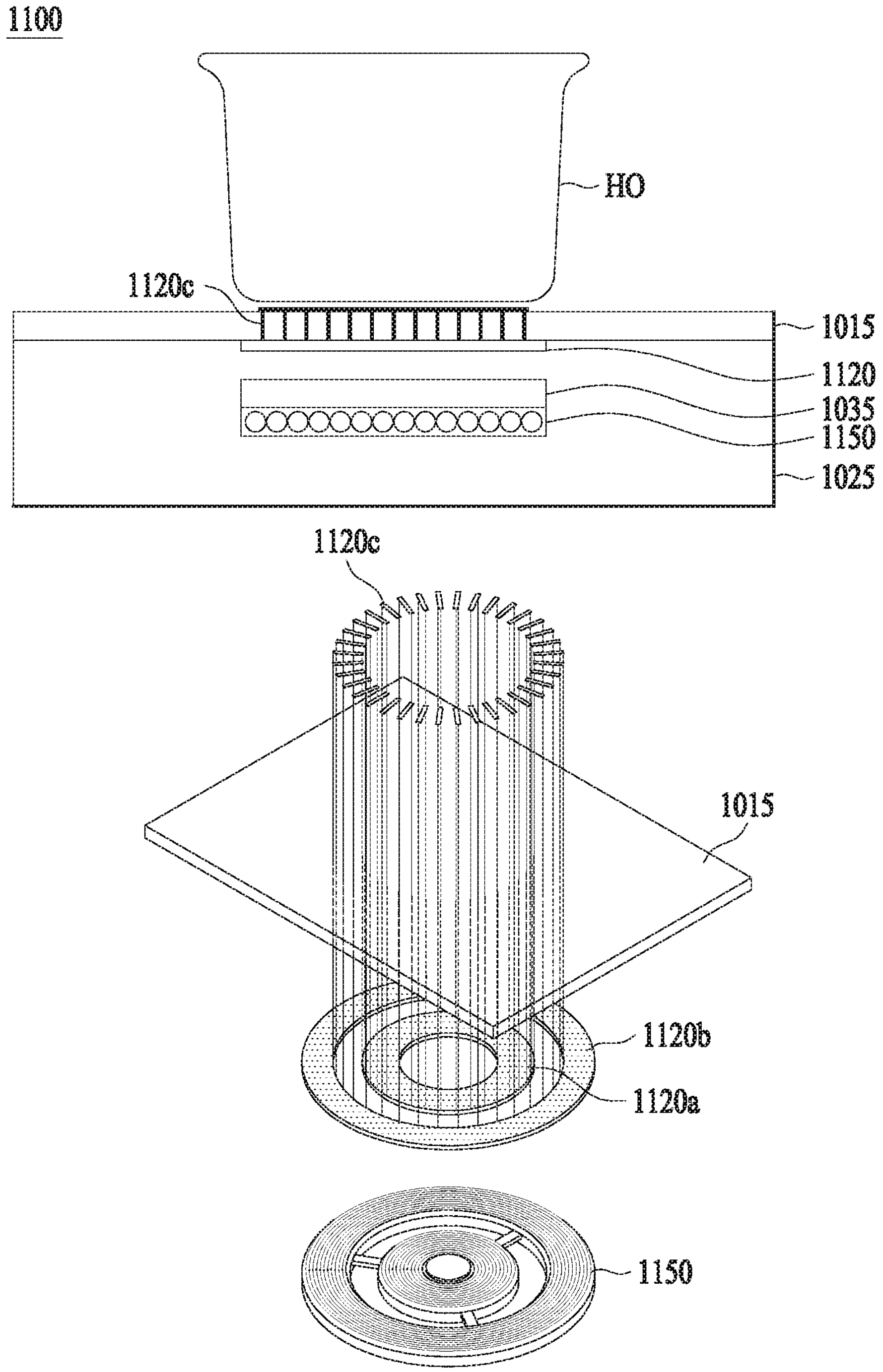

FIG. 16D illustrates an example where the thin film 1120 including the plurality of sub-thin films 1120*a* and 1120*b* is disposed at the bottom of the upper plate 1015 and the heat conduction member 1120*c* is disposed at the top of the upper plate 1015.

In some implementations, the thin film 1120 may include a plurality of sub-thin films 1120*a* and 1120*b* disposed at the bottom of the upper plate 1015, and this type of structure may correspond to the structure illustrated in FIG. 16B. Furthermore, the thin film 1120 may include the plurality of sub-thin films 1120*a* and 1120*b*, and the heat conduction member 1120*c* connected to at least one of the plurality of sub-thin films 1120*a* and 1120*b*. In some implementations, the heat conduction member 1120*c* to which heat is conducted from the plurality of sub-thin films 1120*a* and 1120*b* may contact a target heating object HO and heat the target heating object HO by conducting the heat to the target heating object HO through the contact with the target heating object HO. Accordingly, even when the plurality of sub-thin films 1120*a* and 1120*b* is disposed at the bottom of the upper plate 1015, the heat conduction member 1120*c* may pass through the upper plate 1015 and be at least partially disposed at the top of the upper plate 1015.

In some implementations, the thin film 1120 may be disposed in a manner in which the plurality of sub-thin films 1120*a* and 1120*b* and the heat conduction member 1120*c* and 1120*d* are not entirely but partially pass through the upper plate 1015 not to be exposed at the top of the upper plate 1015.

Figure 17:
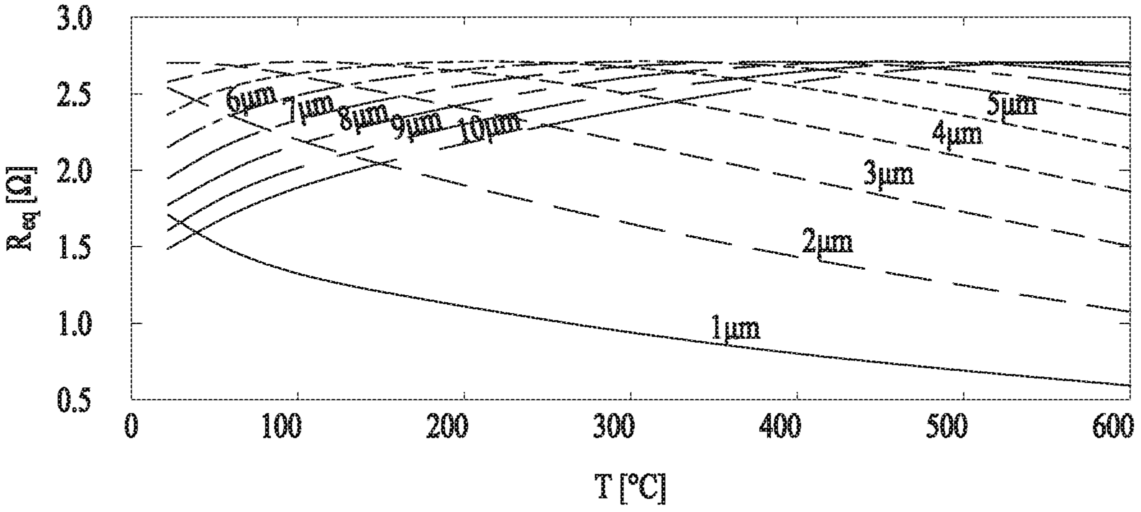
FIG. 17 is a diagram illustrating an example of changes of a resistance component of an equivalent circuit of a thin film according to a temperature of a thin film based on a thickness of the thin film and a driving frequency of a working coil.

FIG. 17 is a diagram illustrating an example of changes of a resistance component of an equivalent circuit of a thin film according to a temperature of a thin film based on a thickness of the thin film and a driving frequency of a working coil.

Referring to FIG. 17, changes of a resistance component of an equivalent circuit according to an increase in temperature based on a thickness of the thin film 1120 may be determined. For example, when the thickness of the thin film 1120 is 1 μm, the resistance component may tend to decrease as the temperature of the thin film 1120 increases. As another example, when the thickness of the thin film 1120 is 10 μm, the resistance component may tend to increase as the temperature of the thin film 1120 increases. In some examples, when the thickness of the thin film 1120 is 6 μm, the resistance component may tend to increase and then decrease as the temperature of the thin film 1120 increases.

In some implementations, the inductor component of the equivalent circuit may tend to increase in size as the temperature of the thin film 1120 increases.

However, such changes of the resistance component may vary according to a driving frequency of the working coil 1150 and a material or shape of the thin film 1120. For example, in the resistance component shown in FIG. 17, the driving frequency of the working coil 1150 may be 40 KHz, and the resistance component of the equivalent circuit may vary according to a material, a shape, or the like of the thin film 1120. Accordingly, the resistance component of the equivalent circuit used in various examples of the present disclosure is not necessarily limited as shown in FIG. 17.

In some implementations, a thin film 1120 of an induction heating type cooktop 1100 may be designed with a predetermined form factor, and a memory 1130 may store in advance information on a correlation corresponding to the predetermined form factor (that is, a thickness of the thin film 1120). In some implementations, the memory 1130 may store information on correlations corresponding to various form factors in advance. A microcontroller unit (MCU) 1140 may obtain information representing the form factor of the induction heating type cooktop 1100, select information on a correlation corresponding to the form factor of the induction heating type cooktop 1100, and use the selected information in the process of estimating a temperature. The MCU 1140 may be an integrated circuit, an electric circuit, a controller, a processor, or the like.

Figure 18:
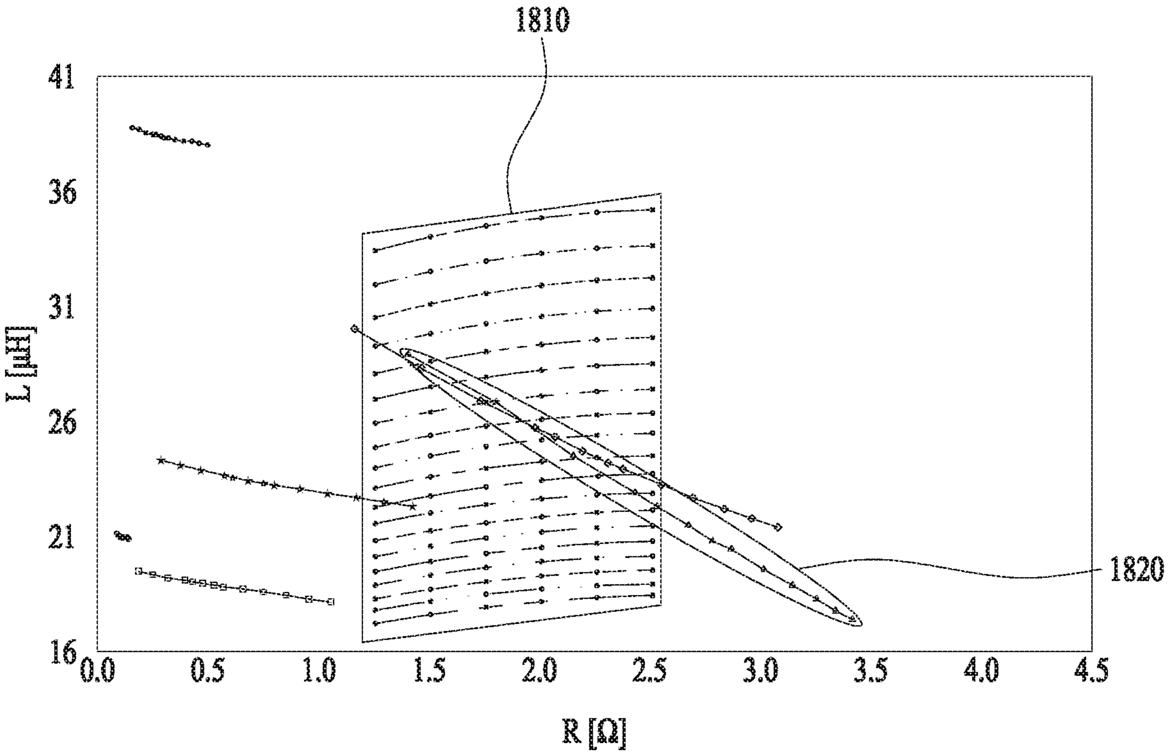
FIG. 18 is a diagram illustrating an example of a distribution of a resistance component and an inductor component of an equivalent circuit capable of induction heating in an induction heating type cooktop.

FIG. 18 is a diagram illustrating an example of a distribution of a resistance component and an inductor component of an equivalent circuit capable of induction heating in an induction heating type cooktop.

Referring to FIG. 18, an equivalent circuit component 1820 formed by a thin film 1120 and a target heating object HO may be partially included in a predetermined region 1810 where induction heating is possible (hereinafter, referred to as an induction heating region 1810). In some implementations, measured values in each graph are measured values of the resistance component and the inductor component according to a driving frequency of a working coil 1150.

In some implementations, since the thin film 1120 should be made of a material that can be induction heated by the working coil 1150, the resistance component and the inductor component of the equivalent circuit formed only of the thin film 1120 should be at least partially included in the induction heating region 1810. In some implementations, when a target heating object HO is made of a non-magnetic material, an equivalent circuit may be formed by the thin film 1120. In some implementations, when the target heating object HO is made of a magnetic material, the equivalent circuit may be formed by the thin film 1120 and the target heating object HO, and the resistance component and the inductor component of the equivalent circuit may be also at least partially included in the induction heating region 1810.

In some implementations, it is possible to heat both a magnetic object and a non-magnetic object by using a thin film capable of being directly induction heated.

The present disclosure provides a plurality of sub-thin films constituting a thin film to be induction heated and a heat conduction member receiving heat conducted from the plurality of sub-thin films and minimizing the flow of an induced current, thereby improving the efficiency of induction heating of a magnetic object and a non-magnetic object, and accordingly the present disclosure may improve the efficiency of induction heating of a magnetic object and a non-magnetic object. In some examples, by arranging the heat conduction member in a predetermined pattern, it may be possible to restrict the thin film from being induction heated to an extreme degree, reduce thermal deformation of the thin film caused by repeated heating and cooling, and heat a target heating object using the thin film that is uniformly heated.

In some implementations, a thin film to be inductively heated includes a plurality of sub-films, thereby reducing a difference in heating temperature in a radial direction within each sub-film and accordingly preventing damage or thermal deformation of the thin film.

In addition to the aforementioned effects, other specific effects have been described above with reference to the foregoing implementations of the present disclosure.

While the present disclosure has been described with respect to the specific implementations, it will be apparent to those skilled in the art that various changes and modifications may be made without departing from the spirit and scope of the disclosure as defined in the following claims.

What is claimed is:

1. An induction heating cooktop, comprising:
- a case;
- an upper plate coupled to a top of the case and configured to support a target heating object;
- a thin film disposed at a top surface of the upper plate or a bottom surface of the upper plate;
- a working coil disposed inside the case and configured to generate a magnetic field to thereby inductively heat at least one of the target heating object or the thin film; and
- an insulator disposed between the bottom surface of the upper plate and the working coil,
- wherein the thin film is configured (i) to be heated by an eddy current that is induced in the thin film by the magnetic field from the working coil based on the target heating object being a non-magnetic object, and (ii) to transmit the magnetic field from the working coil to thereby heat the target heating object based on the target heating object being a magnetic object,
- wherein the thin film is disposed above the working coil and comprises:
  - a plurality of sub-thin films that are arranged about a central portion of the working coil, each of the plurality of sub-thin films defining a closed loop surrounding the central portion of the working coil, and a heat conduction member that is arranged in a predetermined pattern and contacts at least one of the plurality of sub-thin films, and wherein the heat conduction member comprises a plurality of radial connections arranged in a circumferential direction and spaced apart from one another in the circumferential direction, each of the plurality of radial connections extending in a radial direction between the plurality of sub-thin films.

2. The induction heating cooktop of claim 1, wherein each of the plurality of sub-thin films has a ring shape that defines the closed loop.

3. The induction heating cooktop of claim 1, wherein at least a portion of the magnetic field of the working coil has a magnitude greater than or equal to a predetermined threshold, and wherein the heat conduction member is disposed at a position corresponding to at least the portion of the magnetic field.

4. The induction heating cooktop of claim 1, wherein the plurality of sub-thin films are spaced apart from one another in the radial direction.

5. The induction heating cooktop of claim 1, wherein the predetermined pattern of the heat conduction member comprises a comb pattern.

6. The induction heating cooktop of claim 5, wherein the heat conduction member has a width that is less than or equal to a predetermined threshold width to thereby limit a magnitude of current leaked from the plurality of sub-thin films to the heat conduction member.

7. The induction heating cooktop of claim 6, wherein the magnitude of current in the heat conduction member is less than or equal to a predetermined threshold current level.

8. The induction heating cooktop of claim 6, wherein the width of the heat conduction member is in a range from 1 mm to 5 mm.

9. The induction heating cooktop of claim 1, wherein the plurality of sub-thin films are configured to, based on the target heating object made of a non-magnetic material being placed on the upper plate, be heated by induction and provide heat to each of the heat conduction member and the target heating object to thereby heat the target heating object by the plurality of sub-thin films and the heat conduction member.

10. The induction heating cooktop of claim 1, wherein the heat conduction member is configured to, based on the target heating object made of a magnetic material being placed at the upper plate, pass the magnetic field that is generated by the working coil through the heat conduction member to thereby inductively heat the target heating object.

11. The induction heating cooktop of claim 1, wherein the working coil is configured to induce current based on the thin film and the target heating object forming an equivalent circuit comprising a resistance component and an inductor component.

12. The induction heating cooktop of claim 11, wherein a thickness of the thin film defines the resistance component and the inductor component of the equivalent circuit to enable induction heating by the working coil.

13. The induction heating cooktop of claim 12, wherein the thickness of the thin film is 6 μm.

14. The induction heating cooktop of claim 1, wherein a thickness of the thin film is less than a skin depth of the thin film.

15. The induction heating cooktop of claim 1, wherein each of the plurality of radial connections connects to the plurality of sub-thin films in the radial direction.

16. The induction heating cooktop of claim 15, wherein each of the plurality of radial connections has a linear shape parallel to the radial direction.

17. The induction heating cooktop of claim 15, wherein each of the plurality of radial connections has a curved shape extending in the circumferential direction and the radial direction between the plurality of sub-thin films.

18. The induction heating cooktop of claim 1, wherein the plurality of radial connections comprise:

a plurality of first radial connections that extend radially outward from an inner sub-thin film among the plurality of sub-thin films; and a plurality of second radial connections that extend from an outer sub-thin film among the plurality of sub-thin films toward the inner sub-thin film, and wherein the plurality of first radial connections and the plurality of second radial connections are alternately arranged along the circumferential direction.

19. The induction heating cooktop of claim 1, wherein a radial length of each of the plurality of radial connections is less than or equal to a distance between two of the plurality of sub-thin films.

* * * * *